United States Patent
Tokumo et al.

(10) Patent No.: US 12,206,854 B2
(45) Date of Patent: Jan. 21, 2025

(54) 3D DATA DECODING APPARATUS AND 3D DATA CODING APPARATUS

(71) Applicant: SHARP KABUSHIKI KAISHA, Sakai (JP)

(72) Inventors: Yasuaki Tokumo, Sakai (JP); Keiichiro Takada, Sakai (JP); Tomohiro Ikai, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 46 days.

(21) Appl. No.: 18/116,853

(22) Filed: Mar. 3, 2023

(65) Prior Publication Data

US 2024/0205407 A1 Jun. 20, 2024

(30) Foreign Application Priority Data

Dec. 16, 2022 (JP) ................. 2022-201271

(51) Int. Cl.
*H04N 19/42* (2014.01)
*H04N 19/13* (2014.01)
*H04N 19/137* (2014.01)
*H04N 19/196* (2014.01)

(52) U.S. Cl.
CPC ........... *H04N 19/13* (2014.11); *H04N 19/137* (2014.11); *H04N 19/197* (2014.11)

(58) Field of Classification Search
CPC ..... H04N 19/13; H04N 19/137; H04N 19/197
See application file for complete search history.

(56) References Cited

U.S. PATENT DOCUMENTS

| | | | |
|---|---|---|---|
| 2019/0174133 A1* | 6/2019 | Abe | H04N 19/157 |
| 2020/0302658 A1* | 9/2020 | Simon | H04N 19/176 |
| 2021/0287430 A1* | 9/2021 | Li | G06V 10/776 |
| 2022/0343582 A1* | 10/2022 | Anton Dominguez | G06F 30/20 |
| 2023/0033616 A1* | 2/2023 | Han | H04N 19/136 |
| 2023/0343010 A1* | 10/2023 | Kwatra | G06T 17/20 |

FOREIGN PATENT DOCUMENTS

WO 2021/210548 A1 10/2021

OTHER PUBLICATIONS

"Information technology—Coded Representation of Immersive Media—Part 5: Visual Volumetric Video-based Coding (V3C) and Video-based Point Cloud Compression (V-PCC)", ISO/IEC 23090-5:2021(2E), ISO/IEC JTC 1/SC 29/WG 07, Secretariat: AFNOR (France).

(Continued)

*Primary Examiner* — Howard D Brown, Jr.
(74) *Attorney, Agent, or Firm* — ScienBiziP, P.C.

(57) ABSTRACT

A 3D data decoding apparatus for decoding coded data. The 3D data decoding apparatus includes an arithmetic decoder configured to arithmetically decode mesh displacement from the coded data, a context selection unit configured to select a context in the arithmetic decoding, and a context initialization unit configured to set an initial value of the context. In the context initialization unit, a context initialization parameter for initializing the context is decoded from the coded data.

4 Claims, 15 Drawing Sheets

(56) References Cited

OTHER PUBLICATIONS

Apple Inc., "[V-CG] Apple's Dynamic Mesh Coding CfP Response", ISO/IEC JTC 1/SC 29/WG 7 m59281, Online—Apr. 2022.

Chao Huang et al., "Arithmetic Coding of Displacements for Subdivision-based Mesh Compression", ISO/IEC JTC 1/SC 29/WG 7 m60300, Online—Jul. 2022.

Nishimura et al., "[V-DMC] [new] Block-Based Context-Adaptive Arithmetic Coding of Displacements", ISO/IEC JTC 1/SC 29/WG 7, No. m61065, Oct. 24, 2022-Oct. 28, 2022, MAINZ, Oct. 21, 2022 (Oct. 21, 2022).

Sharp Corporation, "[V-DMC] [EE4.7-related] Improvement on displacement arithmetic coding", ISO/IEC JTC 1/SC 29/WG 7, No. m61808, Jan. 16, 2023-Jan. 20, 2023, Jan. 6, 2023 (Jan. 6, 2023).

\* cited by examiner

| atlas_sequence_parameter_set_rbsp( ) { | Descriptor |
|---|---|
| asps_atlas_frame_parameter_set_id | ue(v) |
| ... | |
| asps_extension_present_flag | u(1) |
| if( asps_extension_present_flag ) { | |
| asps_miv_extension_present_flag | u(1) |
| asps_vpcc_extension_present_flag | u(1) |
| asps_vdmc_extension_present_flag | u(1) |
| asps_extension_5bits | u(5) |
| } | |
| ... | |
| if( asps_vdmc_extension_present_flag ) | |
| asps_vdmc_extension( ) | |
| ... | |
| } | |

| asps_vdmc_extension( ) { | Descriptor |
|---|---|
| asps_vdmc_ext_displacement_coordinate_system | u(3) |
| asps_vdmc_ext_displacement_context_init_type | u(1) |
| asps_vdmc_ext_displacement_context_init_index | u(2) |
| } | |

FIG. 7

| atlas_frame_parameter_set_rbsp( ) { | Descriptor |
|---|---|
| afps_atlas_frame_parameter_set_id | ue(v) |
| ... | |
| afps_extension_present_flag | u(1) |
| if( afps_extension_present_flag ) { | |
| afps_miv_extension_present_flag | u(1) |
| afps_vpcc_extension_present_flag | u(1) |
| afps_vdmc_extension_present_flag | u(1) |
| afps_extension_5bits | u(5) |
| } | |
| ... | |
| if( asps_vdmc_extension_present_flag ) | |
| afps_vdmc_extension( ) | |
| ... | |
| } | |

| afps_vdmc_extension( ) { | Descriptor |
|---|---|
| afps_vdmc_ext_displacement_coordinate_system_enable_flag | u(1) |
| if ( afps_vdmc_ext_displacement_coordinate_system_enable_flag ) | |
| afps_vdmc_ext_displacement_coordinate_system | u(3) |
| afps_vdmc_ext_displacement_context_init_enable_flag | u(1) |
| if ( afps_vdmc_ext_displacement_context_init_enable_flag ) | |
| asps_vdmc_ext_displacement_context_init_type | u(1) |
| asps_vdmc_ext_displacement_context_init_index | u(2) |
| } | |

FIG. 8

BASE MESH

SUBDIVIDED MESH

DEFORMED MESH

○ : VERTEX

↗ : MESH DISPLACEMENT

MESH

BASE MESH

SUBDIVIDED MESH

MESH DISPLACEMENT

○ : VERTEX
↗ : MESH DISPLACEMENT

| vdmc_displacement_coeff() { | Descriptor |
|---|---|
|   for ( i = 0; i < coeff_num; i += 1 ) { | |
|     gt0_flag | ae(v) |
|     if (gt0_flag > 0) { | |
|       sign_flag | ae(v) |
|       gt1_flag | ae(v) |
|       if (gt1_flag > 0) { | |
|         rem_prefix | ae(v) |
|         if (rem_prefix > TH) { | |
|           rem_suffix | ae(v) |
|         } | |
|       } | |
|     } | |
|   } | |
| } | |

FIG. 15

3D DATA DECODING APPARATUS AND 3D DATA CODING APPARATUS

TECHNICAL FIELD

Embodiments of the present disclosure relate to a 3D data coding apparatus and a 3D data decoding apparatus.

BACKGROUND ART

In order to efficiently transmit or record 3D data, there are a 3D data coding apparatus that projects 3D data into a two-dimensional image, performs coding with a video coding scheme, and generates coded data, and a 3D data decoding apparatus that decodes a two-dimensional image from the coded data and reconstructs the 3D data.

As specific 3D data coding schemes, for example, there are MPEG-I Volumetric Video-based Coding (V3C) and Video-based Point Cloud Compression (V-PCC) (NPL 1). In V3C, in addition to a point cloud including positions of points and attribute information, a multi-view video can be coded and decoded. Existing video coding schemes include, for example, H. 266/Versatile Video Coding (VVC), H. 265/High Efficiency Video Coding (HEVC), and the like.

CITATION LIST

Non Patent Literature

NPL 1: ISO/IEC 23090-5
NPL 2: [V-CG] Apple's Dynamic Mesh Coding CfP Response, ISO/IEC JTC 1/SC 29/WG 7 m59281, April 2022
NPL 3: Arithmetic Coding of Displacements for Subdivision-based Mesh Compression, ISO/IEC JTC 1/SC 29/WG 7 m60300, July 2022

SUMMARY

Technical Problem

In the 3D data coding scheme of NPL 1, a geometry (depth image) and an attribute (color image) constituting 3D data (point cloud) are coded and decoded using the video coding schemes such as HEVC and VVC. In the 3D data coding scheme of NPL 2, a geometry (base mesh, mesh displacement (mesh displacement array, mesh displacement image)) and an attribute (texture mapping image) constituting 3D data (mesh) are coded and decoded using a vertex coding scheme such as Draco and the video coding schemes such as HEVC and VVC. There are experimental results that, in a case that the 3D data (mesh) is coded and decoded using the video coding schemes disclosed in NPL 2, replacing the video coding schemes with an arithmetic coding scheme to perform the coding of the mesh displacement enhances performance (NPL 3). In a case that the mesh displacement is arithmetically coded, there is a problem in that performance thereof depends on an initial value of context in arithmetic coding.

The present disclosure has an object to enhance coding efficiency of a mesh displacement and code and decode 3D data with high quality in coding and decoding of the 3D data using a video coding scheme.

Solution to Problem

In order to solve the problem described above, a 3D data decoding apparatus according to an aspect of the present disclosure is a 3D data decoding apparatus for decoding coded data. The 3D data decoding apparatus includes an arithmetic decoder configured to arithmetically decode mesh displacement from the coded data, a context selection unit configured to select a context in the arithmetic decoding, and a context initialization unit configured to set an initial value of the context. In the context initialization unit, a context initialization parameter for initializing the context is decoded from the coded data.

In order to solve the problem described above, a 3D data coding apparatus according to an aspect of the present disclosure is a 3D data coding apparatus for coding 3D data. The 3D data coding apparatus includes an arithmetic coder configured to arithmetically code mesh displacement, a context selection unit configured to select a context in the arithmetic coding, and a context initialization unit configured to set an initial value of the context. In the context initialization unit, a context initialization parameter for initializing the context is coded into coded data.

Advantageous Effects

According to an aspect of the present disclosure, coding efficiency of a mesh displacement can be enhanced, and 3D data can be coded and decoded with high quality.

BRIEF DESCRIPTION OF DRAWINGS

FIG. 7 is an example of syntax of a configuration for transmitting a coordinate conversion parameter and context initialization parameters at a sequence level (ASPS).
FIG. 8 is an example of syntax of a configuration for transmitting a coordinate conversion parameter and context initialization parameters at a picture/frame level (AFPS).
FIG. 15 is an example of a syntax structure of a mesh displacement.

DESCRIPTION OF EMBODIMENTS

Hereinafter, an embodiment of the present disclosure will be described with reference to the drawings.

Figure 1:
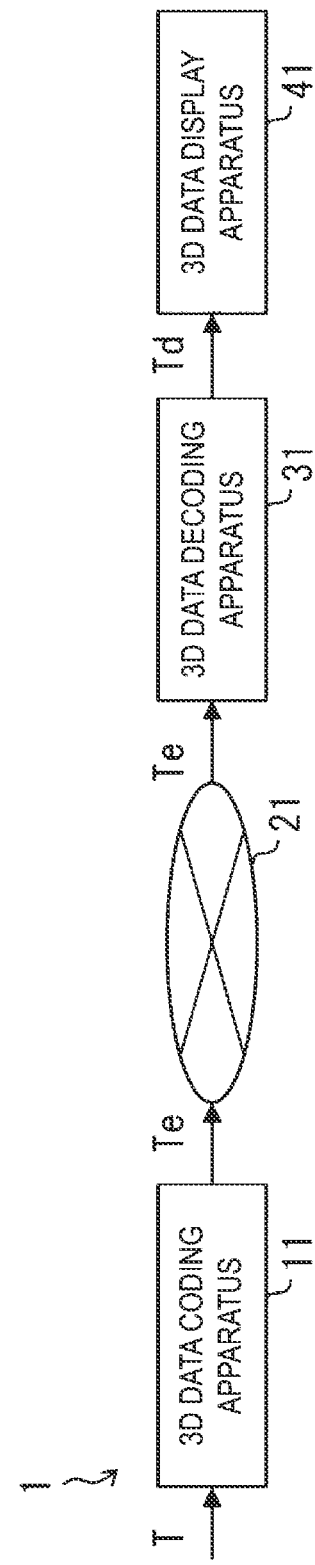
FIG. 1 is a schematic diagram illustrating a configuration of a 3D data transmission system according to the present embodiment.

FIG. 1 is a schematic diagram illustrating a configuration of a 3D data transmission system 1 according to the present embodiment.

The 3D data transmission system 1 is a system in which a coding stream obtained by coding target 3D data is transmitted, the transmitted coding stream is decoded, and thus 3D data is displayed. The 3D data transmission system 1 includes a 3D data coding apparatus 11, a network 21, a 3D data decoding apparatus 31, and a 3D data display apparatus 41.

3D data T is input to the 3D data coding apparatus 11.

The network 21 transmits a coding stream Te generated by the 3D data coding apparatus 11 to the 3D data decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD: trade name) or a Blu-ray Disc (BD: trade name).

The 3D data decoding apparatus 31 decodes each of the coding streams Te transmitted from the network 21 and generates one or multiple pieces of decoded 3D data Td.

The 3D data display apparatus 41 displays all or part of the one or multiple pieces of decoded 3D data Td generated by the 3D data decoding apparatus 31. For example, the 3D data display apparatus 41 includes a display device such as a liquid crystal display and an organic Electro-Luminescence (EL) display. Forms of the display include a stationary type, a mobile type, an HMD type, and the like. In a case that the 3D data decoding apparatus 31 has high processing capability, an image having high image quality is displayed, and in a case that the apparatus has lower processing capability, an image which does not require high processing capability and display capability is displayed.

Structure of Coding Stream Te

Prior to the detailed description of the 3D data coding apparatus 11 and the 3D data decoding apparatus 31 according to the present embodiment, a data structure of the coding stream Te generated by the 3D data coding apparatus 11 and decoded by the 3D data decoding apparatus 31 will be described.

Figure 2:
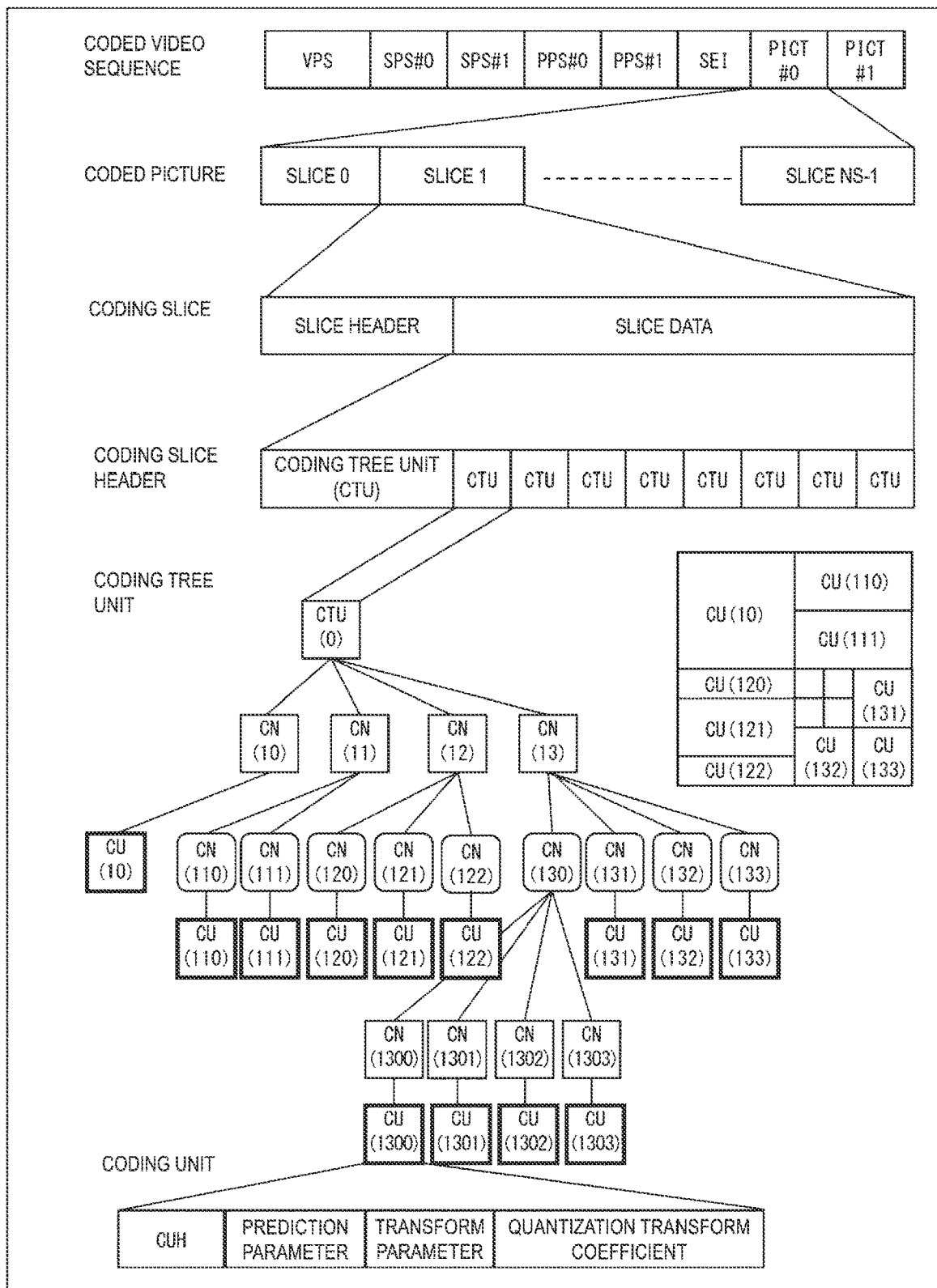
FIG. 2 is a diagram illustrating a hierarchical structure of data of a coding stream.

FIG. 2 is a diagram illustrating the hierarchy structure of data in the coding stream Te. The coding stream Te includes a sequence and multiple pictures constituting the sequence illustratively. FIG. 2 is a diagram illustrating each of a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

Coded Video Sequence

In the coded video sequence, a set of data referred to by the 3D data decoding apparatus 31 to decode the sequence SEQ to be processed is defined. As illustrated in the coded video sequence of FIG. 2, the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the 3D data decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the 3D data decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of the multiple PPSs is selected from each picture in a target sequence.

Coded Picture

In the coded picture, a set of data referred to by the 3D data decoding apparatus 31 to decode the picture PICT to be processed is defined. As illustrated in the coded picture of FIG. 2, the picture PICT includes a slice 0 to a slice NS-1 (NS is the total number of slices included in the picture PICT).

Coding Slice

In the coding slice, a set of data referred to by the 3D data decoding apparatus 31 to decode the slice S to be processed is defined. As illustrated in the coding slice of FIG. 2, the slice includes a slice header and slice data.

The slice header includes a coding parameter group referred to by the 3D data decoding apparatus 31 to determine a decoding method for a target slice. Slice type indication information (slice_type) indicating a slice type is one example of a coding parameter included in the slice header.

Coding Slice Data

In the coding slice data, a set of data referred to by the 3D data decoding apparatus 31 to decode the slice data to be processed is defined. The slice data includes CTUs as illustrated in the coding slice header in FIG. 2.

Coding Tree Unit

In the coding tree unit of FIG. 2, a set of data is defined that is referred to by the 3D data decoding apparatus 31 to decode the CTU to be processed. The CTU is split into coding units CU, each of which is a basic unit of coding processing, by a recursive Quad Tree split (QT split), Binary Tree split (BT split), or Ternary Tree split (TT split).

Coding Unit

As illustrated in the coding unit of FIG. 2, a set of data referred to by the 3D data decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Configuration of 3D Data Decoding Apparatus According to First Embodiment

Figure 3:
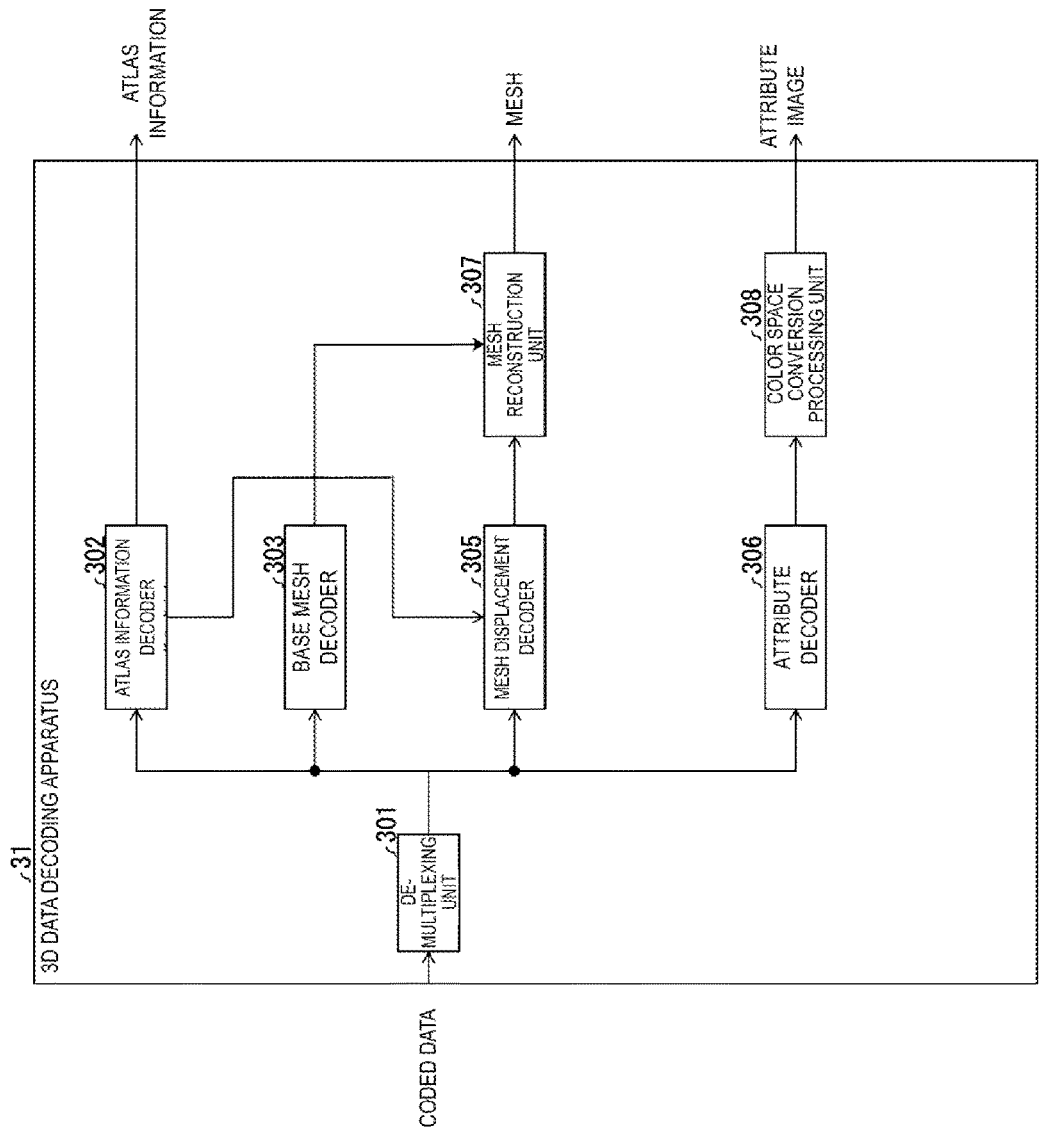
FIG. 3 is a functional block diagram illustrating a schematic configuration of a 3D data decoding apparatus 31.

FIG. 3 is a functional block diagram illustrating a schematic configuration of the 3D data decoding apparatus 31 according to a first embodiment. The 3D data decoding apparatus 31 includes a de-multiplexing unit 301, an atlas information decoder 302, a base mesh decoder 303, a mesh displacement decoder 305, a mesh reconstruction unit 307, an attribute decoder 306, and a color space conversion processing unit 308. The 3D data decoding apparatus 31 inputs coded data of 3D data, and outputs atlas information, a mesh, and an attribute image.

The de-multiplexing unit 301 inputs coded data multiplexed using a byte stream format, an ISO Base Media File Format (ISOBMFF), or the like, de-multiplexes the coded data, and outputs an atlas information coding stream, a base mesh coding stream, a mesh displacement coding stream, and an attribute image coding stream.

The atlas information decoder 302 inputs the atlas information coding stream output from the de-multiplexing unit 301 and decodes atlas information.

The base mesh decoder 303 decodes the base mesh coding stream coded using vertex coding (a 3D data compression coding scheme, such as Draco), and outputs a base mesh. The base mesh will be described below.

The mesh displacement decoder 305 decodes the mesh displacement coding stream and outputs a mesh displacement.

The mesh reconstruction unit 307 inputs the base mesh and the mesh displacement and reconstructs a mesh in a 3D space.

The attribute decoder 306 decodes the attribute image coding stream coded using VVC, HEVC, or the like, and outputs an attribute image of a YCbCr format. The attribute image may be a texture image developed along UV axes (a texture mapping image converted using a UV atlas method).

The color space conversion processing unit 308 performs color space conversion on the attribute image from the YCbCr format to an RGB format. Note that the attribute image coding stream coded as the RGB format may be decoded and the color space conversion may be omitted.

Decoding of Base Mesh

Figure 4:
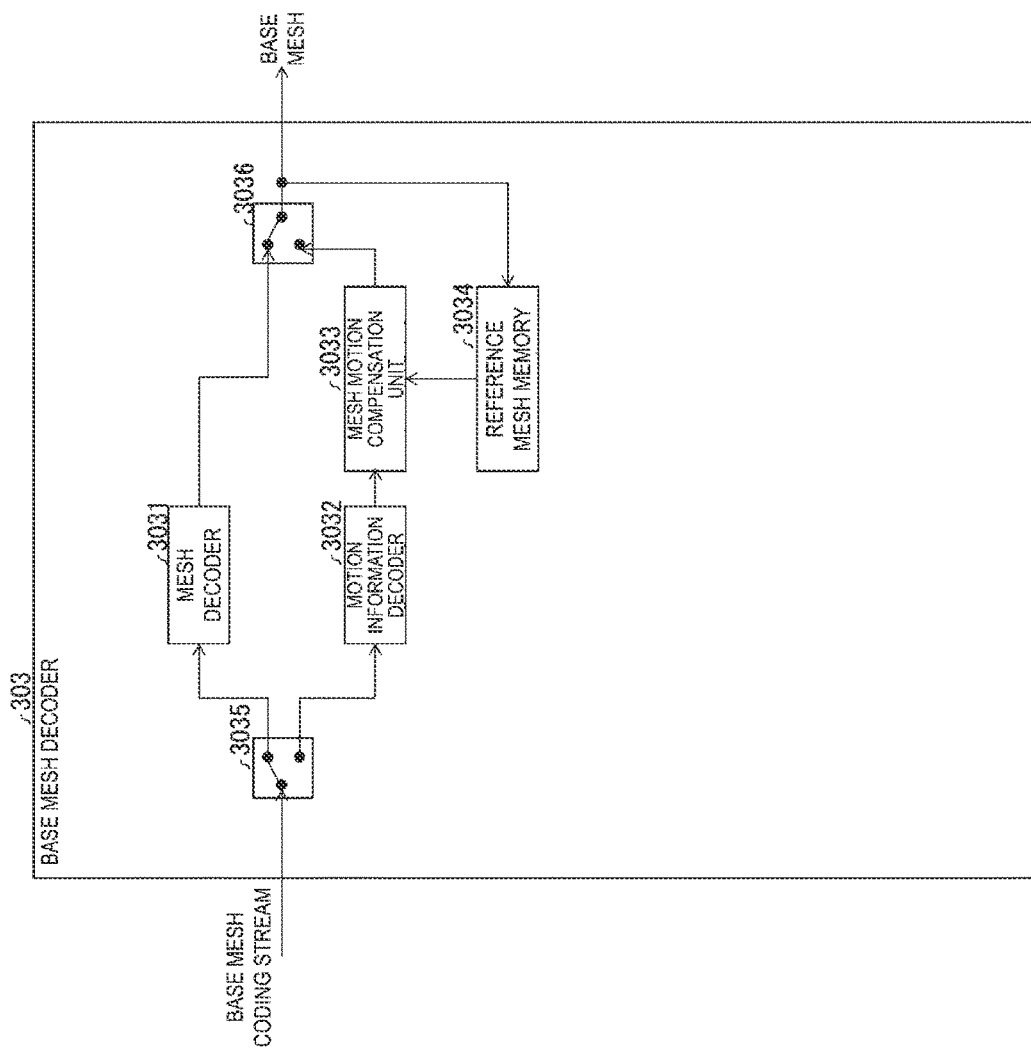
FIG. 4 is a functional block diagram illustrating a configuration of a base mesh decoder 303.

FIG. 4 is a functional block diagram illustrating a configuration of the base mesh decoder 303. The base mesh decoder 303 includes a mesh decoder 3031, a motion information decoder 3032, a mesh motion compensation unit 3033, a reference mesh memory 3034, a switch 3035, and a switch 3036. The base mesh decoder 303 may include a base mesh inverse quantization unit (not illustrated) before outputting the base mesh. In a case that the base mesh to be decoded is coded (intra-coded) without reference to another base mesh (for example, a base mesh that has already been coded and decoded), the switch 3035 and the switch 3036 are connected to a side on which motion compensation is not performed. Otherwise, in other words, in a case that the base mesh to be decoded is coded (inter-coded) with reference to another base mesh, the switch 3035 and the switch 3036 are connected to a side on which motion compensation is performed. In a case that motion compensation is performed, target vertex coordinates are derived with reference to already decoded vertex coordinates and motion information.

The mesh decoder 3031 decodes the intra-coded base mesh coding stream and outputs the base mesh. As a coding scheme, Draco or the like is used.

The motion information decoder 3032 decodes the inter-coded base mesh coding stream, and outputs motion information for each vertex of a reference mesh to be described below. As a coding scheme, entropy coding such as arithmetic coding is used.

The mesh motion compensation unit 3033 performs motion compensation on each vertex of the reference mesh input from the reference mesh memory 3034, based on the motion information, and outputs a mesh with its motion being compensated.

The reference mesh memory 3034 is a memory that stores the decoded mesh, so as to be referred to in later decoding processing.

Decoding of Mesh Displacement

Figure 5:
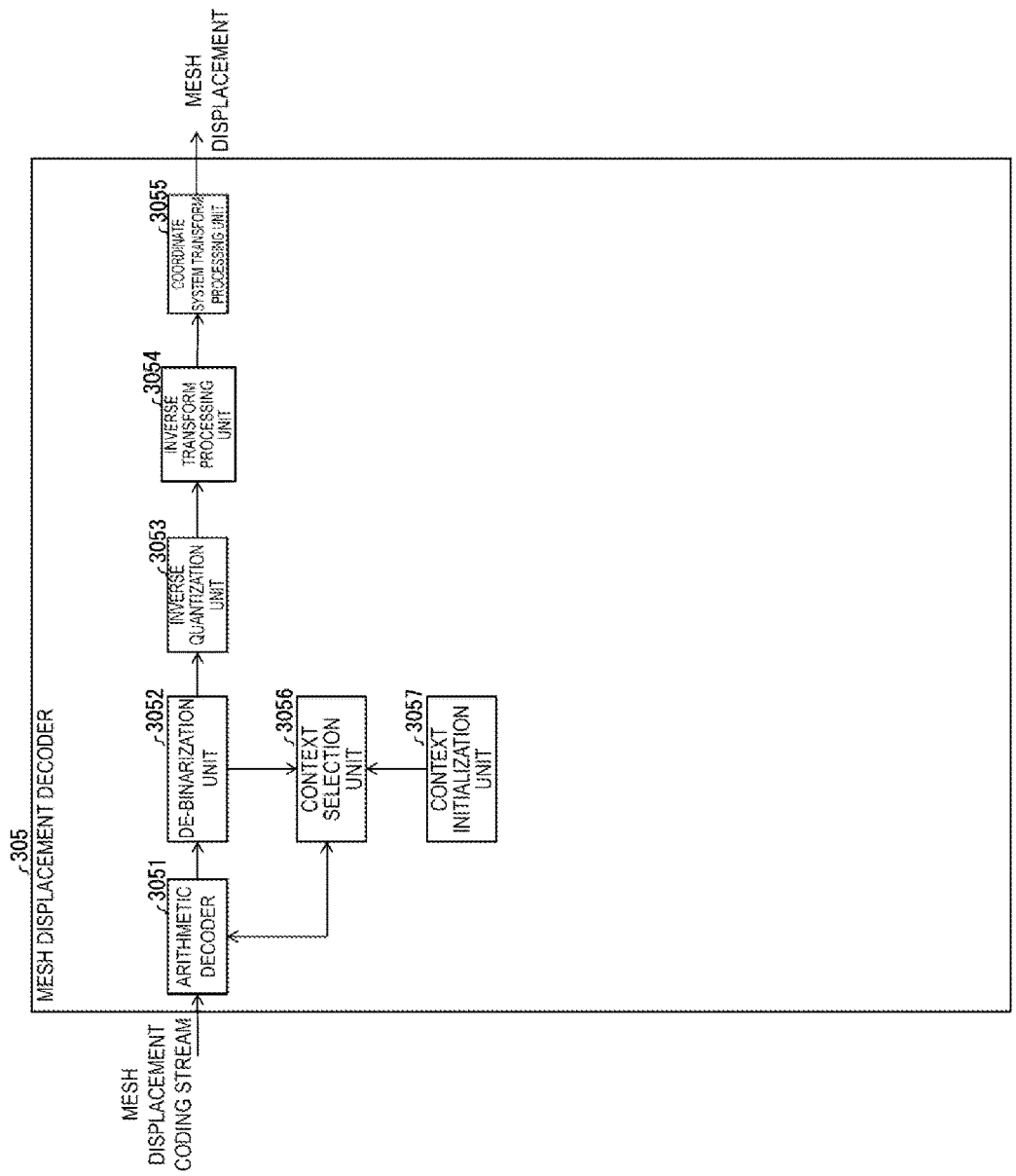
FIG. 5 is a functional block diagram illustrating a configuration of a mesh displacement decoder 305.

FIG. 5 is a functional block diagram illustrating a configuration of the mesh displacement decoder 305. The mesh displacement decoder 305 includes an arithmetic decoder 3051, a de-binarization unit (inverse binarization unit) 3052, a context selection unit 3056, a context initialization unit 3057, an inverse quantization unit 3053, an inverse transform processing unit 3054, and a coordinate system conversion processing unit 3055.

The atlas information decoder 302 of FIG. 3 decodes, from coded data, pieces of coordinate system conversion information (asps_vdmc_ext_displacement_coordinate_system, afps_vdmc_ext_displacement_coordinate_system) indicating a coordinate system, and signals the mesh displacement decoder 305. The atlas information decoder 302 decodes context initialization parameters (asps_vdmc_ext_displacement_context_init_type, asps_vdmc_ext_displacement_context_init_index, afps_vdmc_ext_displacement_context_init_type, afps_vdmc_ext_displacement_context_init_index) in arithmetic decoding, and signals the mesh displacement decoder 305. The context initialization parameters are information indicating initialization timing of context in arithmetic decoding (for example, initialization for each Group of Frames (GoF), initialization for each frame) and timing of switching an initial value of the context. Note that a gating flag may be separately provided, and only in a case that the gating flag is 1, each piece of coordinate system conversion information may be decoded. The gating flag is, for example, afps_vdmc_ext_displacement_coordinate_system_enable_flag. The context initialization parameters may also be provided with a gating flag, and only in a case that the gating flag is 1, the context initialization parameters may be decoded. The gating flag is, for example, afps_vdmc_ext_displacement_context_init_enable_flag.

Context-Adaptive Binary Arithmetic Coding

The arithmetic decoder 3051, the de-binarization unit 3052, the context selection unit 3056, and the context initialization unit 3057 use a decoding method referred to as Context-adaptive binary arithmetic coding (CABAC). These may be collectively referred to as a CABAC decoder. In CABAC, all of CABAC states are initialized at a start of a segment. In the CABAC decoder, each bit of a binary string (Bin String) corresponding to a syntax element is decoded. In a case that context is used, a context index ctxInc is derived for each bit of the syntax element, the bit is decoded using the context, and the CABAC state of the used context is updated. Bits that do not use the context are decoded at an equal probability (EP, bypass), and derivation of ctxInc and the CABAC state are omitted. The context is a variable area for storing a probability (state) of CABAC, and is identified with a value (0, 1, 2, . . . ) of ctxIdx. A case that 0 and 1 are invariably equal probabilities, i.e., 0.5, 0.5, is referred to as EqualProbability (EP) or bypass. In this case, the state need not be stored for a specific syntax element, and thus context is not used. ctxIdx is derived with reference to ctxInc.

Coordinate System

For coordinate systems of the mesh displacement (three-dimensional vector), the following two types of coordinate systems are used. Cartesian coordinate system: An orthogonal coordinate system defined in common in the entire 3D space. An (X, Y, Z) coordinate system. An orthogonal coordinate system in which directions do not change at the same time (within the same frame, within the same tile). Local coordinate system: An orthogonal coordinate system defined for each region or for each vertex in the 3D space. An orthogonal coordinate system in which directions may change at the same time (within the same frame, within the same tile). A normal (D), tangent (U), bi-tangent (V) coordinate system. In other words, this is an orthogonal coordinate system including a first axis (D) indicated by a normal vector n_vec in a certain vertex (a plane including the certain vertex), and a second axis (U) and a third axis (V) indicated by two tangent vectors t_vec and b_vec orthogonal to the normal vector n_vec. n_vec, t_vec, and b_vec are each a three-dimensional vector. The (D, U, V) coordinate system may be referred to as an (n, t, b) coordinate system.

Decoding and Derivation of Control Parameters at Sequence Level

Here, control parameters used in the mesh displacement decoder 305 will be described.

FIG. 7 is an example of syntax of a configuration for transmitting a coordinate system conversion parameter and context initialization parameters at a sequence level (Atlas Sequence Parameter Set (ASPS)). In ASPS, with asps_vdmc_extension( ) syntax, the coordinate system conversion parameter and the context initialization parameters are transmitted. Semantics of each field is as follows.

asps_vdmc_ext_displacement_coordinate_system: Coordinate system conversion information indicating the coordinate system of the mesh displacement. In a case that a value thereof is equal to a prescribed first value (for example, 0), this indicates the Cartesian coordinate system. In a case that the value is equal to another second value (for example, 1), this indicates the local coordinate system.

asps_vdmc_ext_displacement_context_init_type: Context initialization timing information. This indicates the initialization timing of the context in arithmetic decoding of the mesh displacement. In a case that a value thereof is equal to a first value (for example, 0), the context is initialized for each GoF. In a case that the value is equal to a second value (for example, 1), the context is initialized for each segment (for example, the segment is a frame or a slice constituting the frame). Specifically, in a case that asps_vdmc_ext_displacement_context_init_type=1 (or asps_vdmc_ext_displacement_context_init_type=0 and frameIdxInGoF=0), the mesh displacement decoder 305 initializes the context by using a variable frameIdxInGoF indicating a frame position in GoF.

In another configuration, in a case that asps_vdmc_ext_displacement_context_init_type is the first value, the context is initialized only in a case of a start of a segment and a random access point, and in a case that asps_vdmc_ext_displacement_context_init_type is the second value, the context is invariably initialized at a start of a segment. Note that whether it is the random access point may be determined based on whether nal_unit_type is a specific type. For example, determination may be performed based on whether or not nal_unit_type is equal to NAL_GIDR_W_RADL, NAL_GBLA_N_LP, or NAL_GCRA, or a range from NAL_GBLA_W_LP to NAL_GBLA_N_LP. Whether nal_unit_type is from NAL_GBLA_W_LP to NAL_GBLA_N_LP, or from NAL_GIDR_W_RADL to NAL_GIDR_N_LP may be determined as the random access point.

According to the above-described configuration of performing initialization for each GoF being timing of performing initialization for each random access, deterioration in probability prediction accuracy due to initialization can be minimized, and therefore there is an effect of enhancing coding efficiency. In addition, according to the configuration of selecting initialization for each frame using a flag, there is also an effect of enhancing error tolerance.

asps_vdmc_ext_displacement_context_init_index: This indicates an index of a context initial value table in arithmetic decoding of the mesh displacement.

Decoding and Derivation of Control Parameters at Picture/Frame Level

FIG. 8 is an example of syntax of a configuration for transmitting a coordinate system conversion parameter and context initialization parameters at a picture/frame level (Atlas Frame Parameter Set (AFPS)). In AFPS, with afps_vdmc_extension( ) syntax, the coordinate system conversion parameter and the context initialization parameters are transmitted. Semantics of each field is as follows.

afps_vdmc_ext_displacement_coordinate_system_enable_flag: A flag indicating whether or not the coordinate system of the mesh displacement is to be updated. In a case that the flag is equal to true, the coordinate system of the mesh displacement is updated based on a value of afps_vdmc_ext_displacement_coordinate_system to be described below. In a case that the flag is equal to false, the coordinate system of the mesh displacement is not updated.

afps_vdmc_ext_displacement_coordinate_system: Coordinate system conversion information indicating the coordinate system of the mesh displacement. In a case that a value thereof is equal to a first value (for example, 0), this indicates the Cartesian coordinate system. In a case that the value is equal to a second value (for example, 1), this indicates the local coordinate system. In a case that the syntax element does not appear, it is inferred that the value is a value decoded with ASPS, and a coordinate system indicated by ASPS is used as a default coordinate system.

afps_vdmc_ext_displacement_context_init_enable_flag: A flag indicating whether or not a context initialization method for mesh displacement is to be updated. In a case that the flag is equal to true, the context initialization method is updated based on a value of afps_vdmc_ext_displacement_context_init_type and a value of afps_vdmc_ext_displacement_context_init_index to be described below. In a case that the flag is equal to false, the context initialization method is not updated.

afps_vdmc_ext_displacement_context_init_type: Context initialization timing information. This indicates the initialization timing of the context in arithmetic decoding of the mesh displacement. In a case that a value thereof is equal to a first value (for example, 0), the context is initialized for each GoF. In a case that the value is equal to a second value (for example, 1), the context is initialized for each segment (for example, the segment is a frame or a slice constituting the frame).

afps_vdmc_ext_displacement_context_init_index: A context initialization index. Context initial value selection information. This indicates an index of a context initial value table in arithmetic decoding of the mesh displacement.

Derivation of Coordinate System Conversion Parameter

The mesh displacement decoder 305 derives the coordinate system conversion parameter displacementCoordinateSystem as follows.

```
if (afps_vdmc_ext_displacement_coordinate_system_enable_flag) {
  displacementCoordinateSystem =
  afps_vdmc_ext_displacement_coordinate_system
} else {
  displacementCoordinateSystem =
  asps_vdmc_ext_displacement_coordinate_system
}
```

Alternatively, in a case that the syntax element appears at multiple levels, the coordinate system conversion parameter displacementCoordinateSystem may be derived by overwriting with a lower level value.

```
displacementCoordinateSystem =
asps_vdmc_ext_displacement_coordinate_system } if
(afps_vdmc_ext_displacement_coordinate_system_enable_flag) {
displacementCoordinateSystem =
afps_vdmc_ext_displacement_coordinate_system
}
```

Derivation of Context Initialization Parameters

The mesh displacement decoder 305 derives context initialization parameters displacementContextInitType and displacementContextInitIndex as follows.

```
if (afps_vdmc_ext_displacement_context_init_enable_flag) {
  displacementContextInitType =
  afps_vdmc_ext_displacement_context_init_type
  displacementContextInitIndex =
  afps_vdmc_ext_displacement_context_init_index
} else {
  displacementContextInitType =
  asps_vdmc_ext_displacement_context_init_type
  displacementContextInitIndex =
  asps_vdmc_ext_displacement_context_init index
}
```

Alternatively, in a case that the syntax element appears at multiple levels, the context initialization parameters displacementContextInitType and displacementContextInitIndex may be derived by overwriting with a lower level value.

```
displacementContextInitType =
asps_vdmc_ext_displacement_context_init_type
displacementContextInitIndex =
asps_vdmc_ext_displacement_context_init_index
if (afps_vdmc_ext_displacement_context_init_enable_flag) {
displacementContextInitType =
afps_vdmc_ext_displacement_context_init_type
displacementContextInitIndex =
afps_vdmc_ext_displacement_context_init_index
}
```

The mesh displacement decoder 305 may derive the context initialization parameters displacementContextInitType and displacementContextInitIndex every time the mesh displacement decoder 305 decodes each of the context initialization parameters. The gating flag may be, for example, afps_vdmc_ext_displacement_context_init_enable_flag. The context initialization parameters may be, for example,
  asps_vdmc_ext_displacement_context_init_type,
  asps_vdmc_ext_displacement_context_init_index,
  afps_vdmc_ext_displacement_context_init_type, and
  afps_vdmc_ext_displacement_context_init_index.
  displacementContextInitType=asps_vdmc_ext_displacement_context_init_type
  displacementContextInitIndex=asps_vdmc_ext_displacement_context_init_index
  displacementContextInitType=afps_vdmc_ext_displacement_context_init_type
  displacementContextInitIndex=afps_vdmc_ext_displacement_context_init_index Syntax Structure of Mesh Displacement FIG. 15 is an example of a syntax structure of a mesh displacement. The mesh displacement decoder 305 decodes coeff_num displacements from coded data. The mesh displacement decoder 305 decodes gt0_flag, and in a case that gt0_flag is a prescribed value, the mesh displacement decoder 305 decodes subsequent sign_flag and gt1_flag. In a case that gt1_flag is the prescribed value, the mesh displacement decoder 305 decodes subsequent rem_prefix. In addition, in a case that rem_prefix is under a prescribed condition (for example, exceeds the prescribed value), the mesh displacement decoder 305 decodes rem_suffix.

gt0_flag is a flag indicating whether or not the absolute value of a mesh displacement coefficient is greater than 0. gt1_flag is a flag indicating whether or not the absolute value of the mesh displacement coefficient is greater than 1. rem_prefix is a prefix part of a Golomb code of the mesh displacement coefficient. rem_suffix is a suffix part of the Golomb code of the mesh displacement coefficient.

Operation of Mesh Displacement Decoder

The arithmetic decoder 3051 decodes the arithmetically coded mesh displacement coding stream, and outputs a binary signal. The binary signal may be a k-th order exponential Golomb code (k-th order Exp-Golomb-code).

The de-binarization unit 3052 decodes a quantized mesh displacement Qdisp being a multivalue signal from the binary signal.

The context selection unit 3056 includes a memory for storing contexts, and updates various contexts used for arithmetic decoding of the mesh displacement depending on a state. In arithmetic decoding of each coefficient of the mesh displacement, the following different context arrays may be used depending on a frame type ft (for example, 0: intra frame, 1: inter frame), a level lod (level of detail) of mesh subdivision, and a dimension dim of a mesh displacement vector. The context at least includes a variable indicating an occurrence probability of the binary signal.

```
ctxSign[NUM_FT][NUM_LOD][NUM_DIM]
ctxCoeffGtN[NUM_FT][NUM_LOD][2][NUM_DIM]
ctxCoeffRemPrefix[NUM_FT][NUM_LOD][NUM_DIM][7]
ctxCoeffRemSuffix[NUM_FT][NUM_LOD][NUM_DIM][7]
```

Here, NUM_FT is the number of frame types, and NUM_FT=2. NUM_LOD is a maximum number of levels of mesh subdivision, and NUM_LOD=4. NUM_DIM is the number of dimensions of the mesh displacement vector, and NUM_DIM=3.

ctxSign[NUM_FT][NUM_LOD][NUM_DIM] is a context array used to decode the syntax element sign_flag. The arithmetic decoder 3051 decodes sign_flag of the displacement of the frame type ft, the level lod, and the dimension dim of the mesh displacement vector by using a value of ctxSign[ft][lod][dim]. Although an example of using the context is described herein, bypass may be used without using the context. In the configuration of using bypass, there is an effect in which the memory of the contexts and the amount of processing are reduced.

ctxCoeffGtN[NUM_FT][NUM_LOD][2][NUM_DIM] is a context array used to decode the syntax elements gt0_flag and gt1_flag. The arithmetic decoder 3051 decodes gt0_flag and gt1_flag of the displacement of the frame type ft, the level lod, and the dimension dim of the mesh displacement vector by using values of ctxCoeffGtN[ft][lod][0][dim] and ctxCoeffGtN[ft][lod][1][dim].

ctxCoeffRemPrefix[NUM_FT][NUM_LOD][NUM_DIM] [7] is a context array used to decode the syntax element rem_prefix. The arithmetic decoder 3051 decodes rem_prefix[ft][lod][dim] of the displacement of the frame type ft, the level lod, and the dimension dim of the mesh displacement vector by using a value of ctxCoeffRemPrefix[ft][lod][dim][binIdx]. Here, binIdx indicates a bin position of binary of rem_prefix.

ctxCoeffRemSuffix[NUM_FT][NUM_LOD][NUM_DIM] [7] is a context array used to decode the syntax element rem_suffix. The arithmetic decoder 3051 decodes rem_suffix[ft][lod][dim] of the displacement of the frame type ft, the level lod, and the dimension dim of the mesh displacement vector by using a value of ctxCoeffRemPrefix[ft][lod][dim][binIdx].

The context initialization unit 3057 initializes the context (occurrence probability of the binary signal), based on the parameters (here, the context initialization parameters displacementContextInitType and displacementContextInitIndex) decoded from the coded data.

In a case that the value of displacementContextInitType is equal to a first value (for example, 0), the context is initialized for each GoF. In a case that the value of displacementContextInitType is equal to a second value (for example, 1), the context is initialized for each frame.

As described above, the initialization timing and the initial value of the context can be set depending on the context initialization parameters. In a case that the context is initialized for each frame, there is no dependency on the context between frames, and therefore random access to any frame can be easily performed, and coding efficiency can be enhanced. In a case that the context is initialized for each GoF, coding efficiency can be further enhanced in comparison to a case that the context is initialized for each frame. An example of the context initial value table will be described below. Note that each value "value" in an initialization table is such a value that 16 bits after the decimal point of an occurrence probability p are expressed in hexadecimal numbers, and p=value/(1<<16). For example, value=0x8000 indicates occurrence probability p=0.5.

Example of Initialization Table for sign_flag

```
const uint16_t LUT_ctxSign[NUM_FT][NUM_LOD][NUM_DIM] = {
  // Intra
  {
    {0x6b22, 0x9d7d, 0x7e03},
    {0xc733, 0x718c, 0x8d53},
    {0xd1e1, 0x76a5, 0x7c78},
    {0xb968, 0x7844, 0x7844}
  },
  // Inter
  {
    {0x5252, 0x9ba6, 0x853c},
    {0x9d59, 0x7e6d, 0x80bf},
    {0x8458, 0x685a, 0x91f7},
    {0x88a0, 0x8870, 0x802d}
  }
};
```

Example of Initialization Table for gt0_flag and gt1_flag

```
const uint16_t
LUT_ctxCoeffGtN[NUM_FT][NUM_LOD][2][NUM_DIM] = {
  // Intra
  {
    {
      {0x50f4, 0xf2fd, 0xf25a},
      {0x5f4f, 0xf55d, 0xfc36}
    },
    {
      {0x42d1, 0xf272, 0xfaf4},
      {0x562d, 0xfb80, 0xfaa1}
    },
    {
      {0xe6e7, 0xfe01, 0xfe02},
      {0xe410, 0xff00, 0xff00}
    },
    {
      {0xfd12, 0xfe01, 0xfe01},
      {0xff01, 0x94a6, 0x94a6}
    }
  },
  // Inter
  {
    {
      {0xb029, 0xfb22, 0xf47c},
      {0xed0f, 0xef09, 0xeefb}
    },
    {
      {0xcfc7, 0xf752, 0xf85f},
      {0xf04c, 0xf769, 0xfbb4}
    },
    {
      {0xf48b, 0xfee4, 0xfe01},
      {0xfd5f, 0xfd9c, 0xfb2d}
    },
    {
      {0xfe02, 0xfe01, 0xfe02},
      {0xff01, 0xb519, 0xa496}
    }
  }
};
```

Example of Initialization Table for rem_prefix

```
const uint16_t
LUT_ctxCoeffRemPrefix[NUM_FT][NUM_LOD][NUM_DIM][7] = {
  // Intra
  {
    {
      {0xa512, 0xe6a5, 0xf888, 0xc5af, 0x8000, 0x8000, 0x8000},
      {0xd0c3, 0x94a6, 0x8000, 0x8000, 0x8000, 0x8000, 0x8000},
      {0xcbcf, 0x8780, 0x8000, 0x8000, 0x8000, 0x8000, 0x8000}
    },
    {
      {0x8ab5, 0xbf66, 0xab08, 0xf98a, 0xf1f6, 0x8000, 0x8000},
      {0xe4fe, 0x9a6b, 0x8000, 0x8000, 0x8000, 0x8000, 0x8000},
      {0xf6de, 0x94a6, 0x8000, 0x8000, 0x8000, 0x8000, 0x8000}
    },
    {
      {0xcc6b, 0xf94b, 0xf93d, 0x8000, 0x8000, 0x8000, 0x8000},
      {0x8000, 0x8000, 0x8000, 0x8000, 0x8000, 0x8000, 0x8000},
      {0x8000, 0x8000, 0x8000, 0x8000, 0x8000, 0x8000, 0x8000}
    },
    {
      {0xd48f, 0xa496, 0x8000, 0x8000, 0x8000, 0x8000, 0x8000},
      {0x8000, 0x8000, 0x8000, 0x8000, 0x8000, 0x8000, 0x8000},
      {0x8000, 0x8000, 0x8000, 0x8000, 0x8000, 0x8000, 0x8000}
    }
  },
  // Inter
  {
    {
      {0xc695, 0xa158, 0xca9d, 0xcde8, 0x8000, 0x8000, 0x8000},
      {0x6338, 0xcde0, 0xb49d, 0x8000, 0x8000, 0x8000, 0x8000},
      {0x9087, 0xb3f6, 0x9d0e, 0x8e60, 0x8000, 0x8000, 0x8000}
    },
```

```
    {
        {0x9c98, 0xdd87, 0xcfaa, 0xb10f, 0x8000, 0x8000, 0x8000},
        {0xca9c, 0xad38, 0x8000, 0x8000, 0x8000, 0x8000, 0x8000},
        {0xd91f, 0xa496, 0x8000, 0x8000, 0x8000, 0x8000, 0x8000}
    },
    {
        {0xd15f, 0xdb03, 0x8780, 0x8000, 0x8000, 0x8000, 0x8000},
        {0x8000, 0x8000, 0x8000, 0x8000, 0x8000, 0x8000, 0x8000},
        {0x94a6, 0x8000, 0x8000, 0x8000, 0x8000, 0x8000, 0x8000}
    },
    {
        {0x8890, 0x8e60, 0x8000, 0x8000, 0x8000, 0x8000, 0x8000},
        {0x8780, 0x8000, 0x8000, 0x8000, 0x8000, 0x8000, 0x8000},
        {0x8000, 0x8000, 0x8000, 0x8000, 0x8000, 0x8000, 0x8000}
    }
  }
};
```

Example of Initialization Table for rem_suffix

```
const uint16_t
LUT_ctxCoeffRemSuffix[NUM_FT][NUM_LOD][NUM_DIM][7] = {
  // Intra
  {
    {
        {0xd236, 0xbced, 0xbd22, 0x8000, 0x8000, 0x8000, 0x8000},
        {0x94a6, 0x8000, 0x8000, 0x8000, 0x8000, 0x8000, 0x8000},
        {0x8780, 0x8000, 0x8000, 0x8000, 0x8000, 0x8000, 0x8000}
    },
    {
        {0x8e79, 0xcf96, 0xd6be, 0xed44, 0x8000, 0x8000, 0x8000},
        {0x9a6b, 0x8000, 0x8000, 0x8000, 0x8000, 0x8000, 0x8000},
        {0x94a6, 0x8000, 0x8000, 0x8000, 0x8000, 0x8000, 0x8000}
    },
    {
        {0xd88b, 0xea9d, 0x8000, 0x8000, 0x8000, 0x8000, 0x8000},
        {0x8000, 0x8000, 0x8000, 0x8000, 0x8000, 0x8000, 0x8000},
        {0x8000, 0x8000, 0x8000, 0x8000, 0x8000, 0x8000, 0x8000}
    },
    {
        {0xa496, 0x8000, 0x8000, 0x8000, 0x8000, 0x8000, 0x8000},
        {0x8000, 0x8000, 0x8000, 0x8000, 0x8000, 0x8000, 0x8000},
        {0x8000, 0x8000, 0x8000, 0x8000, 0x8000, 0x8000, 0x8000}
    }
  },
  // Inter
  {
    {
        {0xc3e1, 0xc53a, 0xb55e, 0x8000, 0x8000, 0x8000, 0x8000},
        {0xbfc2, 0xb49d, 0x8000, 0x8000, 0x8000, 0x8000, 0x8000},
        {0xc348, 0x8e06, 0x8e60, 0x8000, 0x8000, 0x8000, 0x8000}
    },
    {
        {0xc29b, 0xc4f1, 0xa6d8, 0x8000, 0x8000, 0x8000, 0x8000},
        {0xad38, 0x8000, 0x8000, 0x8000, 0x8000, 0x8000, 0x8000},
        {0xa496, 0x8000, 0x8000, 0x8000, 0x8000, 0x8000, 0x8000}
    },
    {
        {0xa848, 0x7871, 0x8000, 0x8000, 0x8000, 0x8000, 0x8000},
        {0x8000, 0x8000, 0x8000, 0x8000, 0x8000, 0x8000, 0x8000},
        {0x8000, 0x8000, 0x8000, 0x8000, 0x8000, 0x8000, 0x8000}
    },
    {
        {0x8e60, 0x8000, 0x8000, 0x8000, 0x8000, 0x8000, 0x8000},
        {0x8000, 0x8000, 0x8000, 0x8000, 0x8000, 0x8000, 0x8000},
        {0x8000, 0x8000, 0x8000, 0x8000, 0x8000, 0x8000, 0x8000}
    }
  }
};
```

The context initialization unit 3057 initializes the initial value of the context used to code and decode binary of sign_flag, gt0_flag, gt1_flag, rem_prefix, and rem_suffix by using values of LUT_ctxSign[ft][lod][dim], LUT_ctxCoeffGtN[ft][lod][ ][dim], LUT_ctxCoeffRemPrefix[ft][lod][dim][ ], and LUT_ctxCoeffRemSuffix[ft][lod][dim][ ], respectively, depending on the frame type ft, the level lod of mesh subdivision, and the dimension dim of the mesh displacement vector. Note that, in a case that the level lod of mesh subdivision exceeds NUM_LOD−1, initialization is performed by using a default value (for example, value=0x8000, p=0.5).

The initial value of the context is switched depending on the features ft, lod, and dim of the mesh displacement, and therefore coding efficiency can be enhanced.

Configuration of Switching Context Initialization Depending on displacementContextInitIndex In addition, initialization may be performed by using displacementContextInitIndex decoded from coded data. The context initialization unit 3057 switches the initial value of the context used to code and decode binary of sign_flag, gt0_flag, gt1_flag, rem_prefix, and rem_suffix depending on the context initialization index displacementContextInitIndex, the frame type ft, the level lod of mesh subdivision, and the dimension dim of the mesh displacement vector. Specifically, initialization is performed by using values of LUT_ctxSign[displacementContextInitIndex][ft][lod][dim], LUT_ctxCoeffGtN[displacementContextInitIndex][ft][lod][ ][dim], LUT_ctxCoeffRemPrefix[displacementContextInitIndex][ft][lod][dim][ ], and LUT_ctxCoeffRemSuffix[displacementContextInitIndex][ft][lod][dim][ ]. With an encoder appropriately selecting displacementContextInitIndex using an optimal context initial value and transmitting displacementContextInitIndex as syntax, context more appropriate for contents can be derived, and therefore coding efficiency can be enhanced.

Configuration of Switching Context Initialization Depending on displacementCoordinateSystem The context initialization unit 3057 may switch the context initialization method, depending on whether the coordinate system is the Cartesian coordinate system or the local coordinate system.

For example, with sys=displacementCoordinateSystem, the context initialization unit 3057 sets the initial value of the context used to code and decode binary of sign_flag, gt0_flag, gt1_flag, rem_prefix, and rem_suffix. For example, initialization is performed by using values of LUT_ctxSign[sys][displacementContextInitIndex][ft][lod][dim], LUT_ctxCoeffGtN[sys][displacementContextInitIndex][ft][lod][ ][dim], LUT_ctxCoeffRemPrefix[sys][displacementContextInitIndex][ft][lod][dim][ ], and LUT_ctxCoeffRemSuffix[sys][displacementContextInitIndex][ft][lod][dim][ ], respectively, depending on the context initialization index displacementContextInitIndex, the coordinate system sys, the frame type ft, the level lod of mesh subdivision, and the dimension dim of the mesh displacement vector.

According to the configuration described above, the context initial value is changed depending on the syntax element displacementCoordinateSystem indicating the coordinate system in coded data, an appropriate initial value can be derived depending on the coordinate system, and therefore coding efficiency can be enhanced. The local coordinate system (n, t, b) exhibits a greater change of displacement corresponding to a small value of dim, in comparison to the Cartesian coordinate system (x, y, z). Thus, it is appropriate that the initial value be set taking such change into consideration.

The (x, y, z) coordinate system may allow use of the same context initial value regardless of the value of dim. In a case that displacementCoordinateSystem indicates the Cartesian coordinate system, the amount of memory of the context initial value table can be reduced by referring to the context initial value table with dim=0.

The inverse quantization unit 3053 performs inverse quantization, based on a quantization scale value iscale, and derives a mesh displacement Tdisp after transform (for example, wavelet transform). Tdisp may be the Cartesian coordinate system or the local coordinate system. iscale is a value derived from a quantization parameter of each component of the mesh displacement image.

```
Tdisp[0][ ] = (Qdisp[0][ ] * iscale[0] + iscaleOffset) >> iscaleShift
Tdisp[1][ ] = (Qdisp[1][ ] * iscale[1] + iscaleOffset) >> iscaleShift
Tdisp[2][ ] = (Qdisp[2][ ] * iscale[2] + iscaleOffset) >> iscaleShift
```

Here, iscaleOffset=1<<(iscaleShift−1). iscaleShift may be a constant determined in advance, or a value obtained by performing coding at a sequence level, a picture/frame level, a tile/patch level, or the like and decoding from coded data may be used.

The inverse transform processing unit 3054 performs inverse transform g (for example, inverse wavelet transform) and derives a mesh displacement d.

```
d[0][ ] = g (Tdisp[0][ ])
d[1][ ] = g (Tdisp[1][ ])
d[2][ ] = g (Tdisp[2][ ])
```

The coordinate system conversion processing unit 3055 converts the mesh displacement (the coordinate system of the mesh displacement) into the Cartesian coordinate system, based on the value of the coordinate system conversion parameter displacementCoordinateSystem. Specifically, in a case that displacementCoordinateSystem=1, conversion is performed from a displacement of the local coordinate system to a displacement of the Cartesian coordinate system. Here, d is a three-dimensional vector indicating the mesh displacement before coordinate system conversion. disp is a three-dimensional vector indicating the mesh displacement after coordinate system conversion, and is the Cartesian coordinate system. n_vec, t_vec, and b_vec are three-dimensional vectors (of the Cartesian coordinate system) corresponding to respective axes of the local coordinate system of a target region or a target vertex.

```
if (displacementCoordinateSystem == 0) {
  disp = d
} else if (displacementCoordinateSystem == 1){
  disp = d[0] * n_vec + d[1] * t_vec + d[2] * b_vec
}
```

The derivation method shown in the above vector multiplication is individually expressed with a scalar as follows.

```
if (displacementCoordinateSystem == 0) {
  for (i = 0; i < 3; i++) {disp[i] = d[i]}
} else if (displacementCoordinateSystem == 1){
  for (i = 0; i < 3; i++) {disp[i] = d[0] * n_vec[i] + d[1] * t_vec[i] +
     d[2] * b_vec[i]}
}
```

Note that the same variable name may be assigned before and after conversion with disp=d, and the value of d may be updated with coordinate conversion.

Alternatively, the following configuration may be employed.

```
if (displacementCoordinateSystem == 0) {
  disp = d
} else if (displacementCoordinateSystem == 1){
  disp = d[0] * n_vec + d[1] * t_vec + d[2] * b_vec
} else if (displacementCoordinateSystem == 2){
  disp = d[0] * n_vec2 + d[1] * t_vec2 + d[2] * b_vec2
}
```

Here, n_vec2, t_vec2, and b_vec2 are three-dimensional vectors (of the Cartesian coordinate system) corresponding to respective axes of the local coordinate system of a neighboring region.

Alternatively, the following configuration may be employed.

```
if (displacementCoordinateSystem == 0) {
  disp = d
} else if (displacementCoordinateSystem == 1){
  disp = d[0] * n_vec3 + d[1] * t_vec3 + d[2] * b_vec3
}
```

Here, n_vec3, t_vec3, and b_vec3 are three-dimensional vectors (of the Cartesian coordinate system) corresponding to respective axes of the local coordinate system of a target region with a reduced variation. For example, vectors of the coordinate system used for decoding are derived from the previous coordinate system and the current coordinate system as follows.

```
n_vec3 = (w * n_vec3 + (WT-w) * n_vec) >> wShift
t_vec3 = (w * t_vec3 + (WT-w) * t_vec) >> wShift
b_vec3 = (w * b_vec3 + (WT-w) * b_vec) >> wShift
```

Here, for example, wShift=2, 3, or 4, WT=1<<wShift, and w=1 . . . WT−1. For example, in a case that w=3 and wShift=3,

```
n_vec3 = (3 * n_vec3 + 5 * n_vec) >> 3
t_vec3 = (3 * t_vec3 + 5 * t_vec) >> 3
b_vec3 = (3 * b_vec3 + 5 * b_vec) >> 3
```

As in the following configuration, a configuration allowing selection depending on the value of the parameter displacementCoordinateSystem decoded from coded data may be employed.

```
if (displacementCoordinateSystem == 0) {
  disp = d
} else if (displacementCoordinateSystem == 1){
  disp = d[0] * n_vec + d[1] * t_vec + d[2] * b_vec
} else if (displacementCoordinateSystem == 6){
  disp = d[0] * n_vec3 + d[1] * t_vec3 + d[2] * b_vec3
}
```

Reconstruction of Mesh

Figure 6:
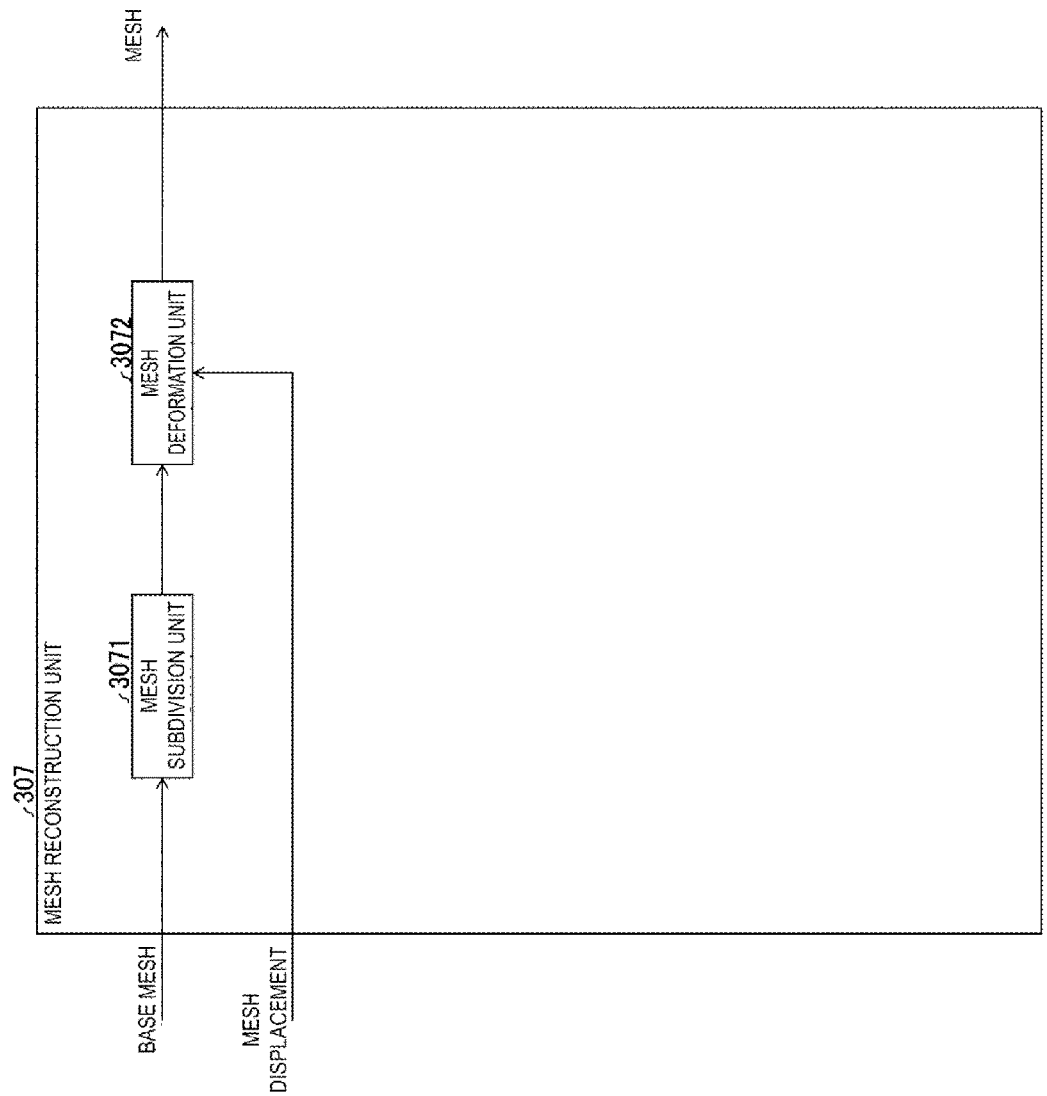
FIG. 6 is a functional block diagram illustrating a configuration of a mesh reconstruction unit 307.

FIG. 6 is a functional block diagram illustrating a configuration of the mesh reconstruction unit 307. The mesh reconstruction unit 307 includes a mesh subdivision unit 3071 and a mesh deformation unit 3072.

The mesh subdivision unit 3071 subdivides the base mesh output from the base mesh decoder 303 and generates a subdivided mesh.

Figure 9A:
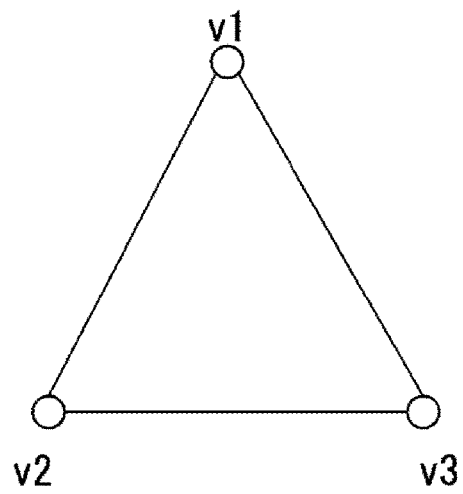
FIGS. 9A, 9B and 9C are diagrams for illustrating operation of the mesh reconstruction unit 307.
Figure 9B:
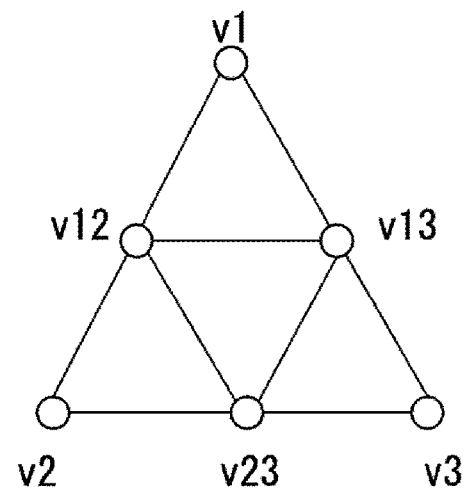

FIG. 9A illustrates a part (triangle) of the base mesh, and the triangle includes vertices v1, v2, and v3. v1, v2, and v3 are each a three-dimensional vector. The mesh subdivision unit 3071 adds new vertices v12, v13, and v23 in the middle of respective sides of the triangle, to thereby generate and output a subdivided mesh (FIG. 9B).

$$v12=(v1+v2)/2$$

$$v13=(v1+v3)/2$$

$$v23=(v2+v3)/2$$

Alternatively, the following may be employed.

$$v12=(v1+v2+1)\gg 1$$

$$v13=(v1+v3+1)\gg 1$$

$$v23=(v2+v3+1)\gg 1$$

Figure 9C:
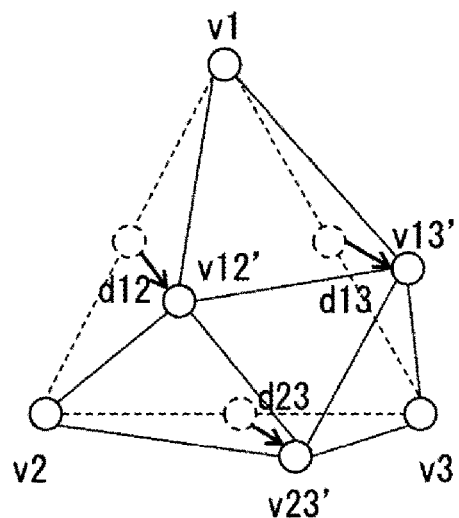

The mesh deformation unit 3072 inputs the subdivided mesh and the mesh displacement, adds mesh displacements d12, d13, and d23, to thereby generate and output a deformed mesh (FIG. 9C). The mesh displacement is an output of the mesh displacement decoder 305 (coordinate system conversion processing unit 3055). d12, d13, and d23 are the mesh displacements respectively corresponding to the vertices v12, v13, and v23 added in the mesh subdivision unit 3071.

$$v12'=v12+d12$$

$$v13'=v13+d13$$

$$v23'=v23+d23$$

Note that the following may be employed: d12=disp[0][ ], d23=disp[1][ ], and d23=disp[3][ ].

Configuration of 3D Data Coding Apparatus According to First Embodiment

Figure 10:
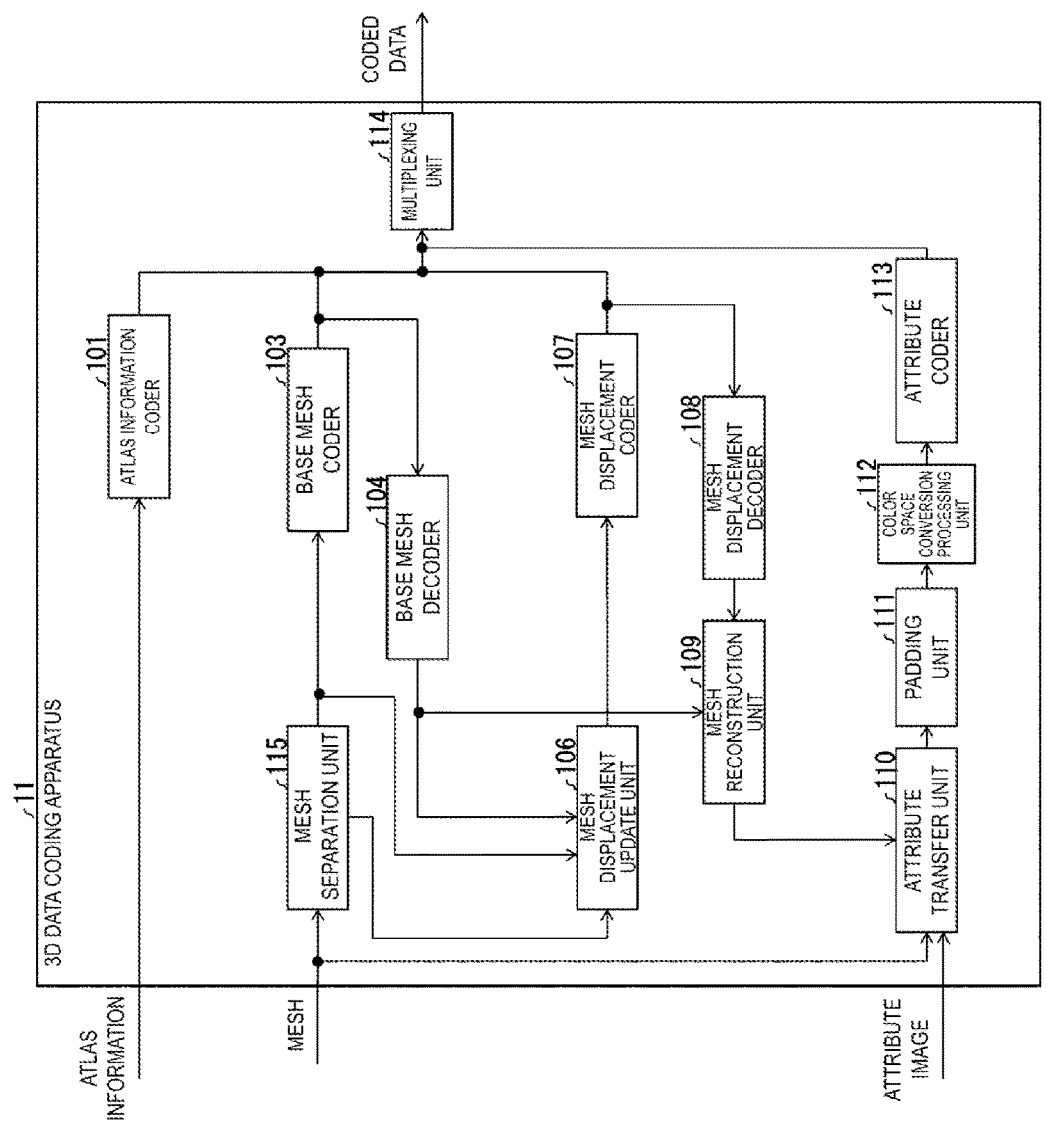
FIG. 10 is a functional block diagram illustrating a schematic configuration of a 3D data coding apparatus 11.

FIG. 10 is a functional block diagram illustrating a schematic configuration of the 3D data coding apparatus 11 according to the first embodiment. The 3D data coding apparatus 11 includes an atlas information coder 101, a base mesh coder 103, a base mesh decoder 104, a mesh displacement update unit 106, a mesh displacement coder 107, a mesh displacement decoder 108, a mesh reconstruction unit 109, an attribute transfer unit 110, a padding unit 111, a color space conversion processing unit 112, an attribute coder 113, a multiplexing unit 114, and a mesh separation unit 115. The 3D data coding apparatus 11 inputs atlas information, a base mesh, a mesh displacement, a mesh, and an attribute image as 3D data, and outputs coded data.

The atlas information coder 101 codes the atlas information.

The base mesh coder 103 codes the base mesh, and outputs a base mesh coding stream. As a coding scheme, Draco or the like is used.

The base mesh decoder 104 is similar to the base mesh decoder 303, and thus description thereof will be omitted.

The mesh displacement update unit 106 adjusts the mesh displacement, based on the (original) base mesh and the decoded base mesh, and outputs an updated mesh displacement.

The mesh displacement coder 107 codes the updated mesh displacement, and outputs a mesh displacement coding stream.

The mesh displacement decoder 108 is similar to the mesh displacement decoder 305, and thus description thereof will be omitted.

The mesh reconstruction unit 109 is similar to the mesh reconstruction unit 307, and thus description thereof will be omitted.

The attribute transfer unit 110 inputs the (original) mesh and the reconfigured mesh output from the mesh reconstruction unit 109 (mesh deformation unit 3072), and attribute image, and outputs an attribute image optimized for the reconfigured mesh.

The padding unit 111 inputs the optimized attribute image, and performs padding processing in a region with empty pixel values.

The color space conversion processing unit 112 performs color space conversion from the RGB format to the YCbCr format.

The attribute coder 113 codes the attribute image of the YCbCr format output from the color space conversion processing unit 112, and outputs an attribute image coding stream. As a coding scheme, VVC, HEVC, or the like is used.

The multiplexing unit 114 multiplexes the atlas information coding stream, the base mesh coding stream, the mesh displacement coding stream, and the attribute image coding stream, and outputs these as coded data. As a multiplexing scheme, a byte stream format, an ISOBMFF, or the like is used.

Operation of Mesh Separation Unit

The mesh separation unit 115 generates the base mesh and the mesh displacement from the mesh.

Figure 13:
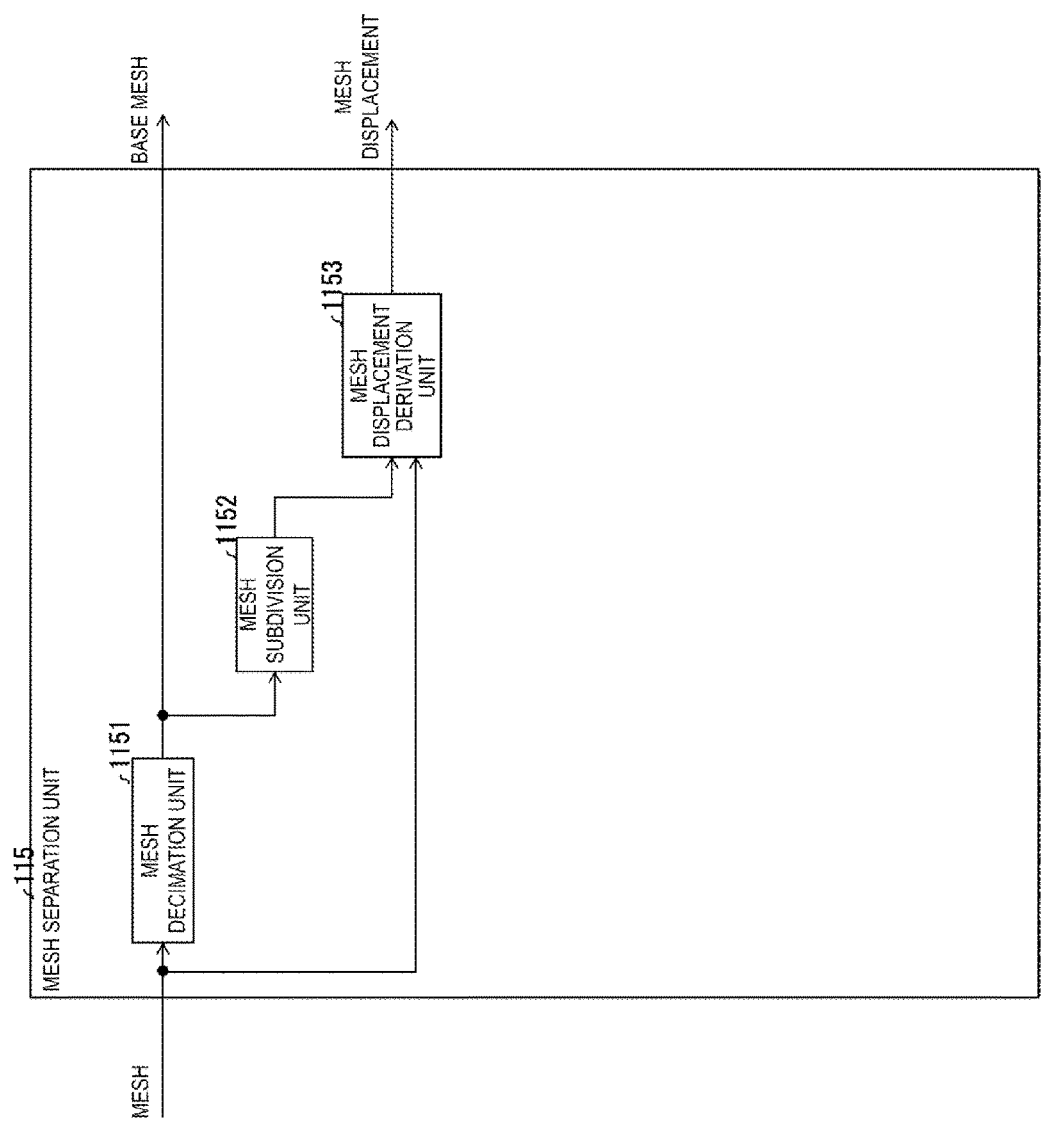
FIG. 13 is a functional block diagram illustrating a configuration of a mesh separation unit 115.

FIG. 13 is a functional block diagram illustrating a configuration of the mesh separation unit 115. The mesh separation unit 115 includes a mesh decimation unit 1151, a mesh subdivision unit 1152, and a mesh displacement derivation unit 1153.

The mesh decimation unit 1151 decimates a part of the vertices from the mesh, to thereby generate a base mesh.

Figure 14A:
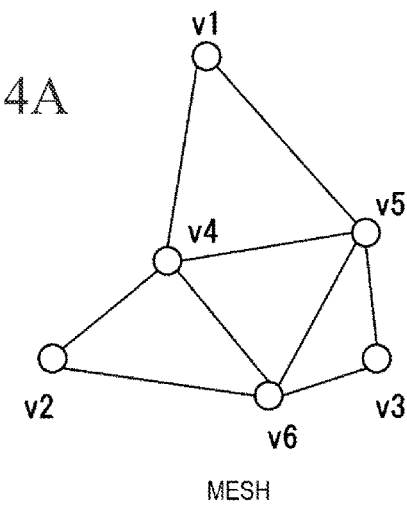
FIGS. 14A, 14B, 14C and 14D are diagrams for illustrating operation of the mesh separation unit 115.
Figure 14B:
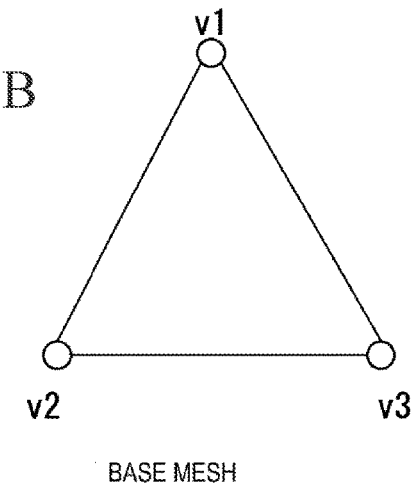

FIG. 14A illustrates a part of the mesh, and the mesh includes vertices v1, v2, v3, v4, v5, and v6. v1, v2, v3, v4, v5, and v6 are each a three-dimensional vector. The mesh decimation unit 1151 decimates the vertices v4, v5, and v6, to thereby generate and output a base mesh (FIG. 14B).

Figure 14C:
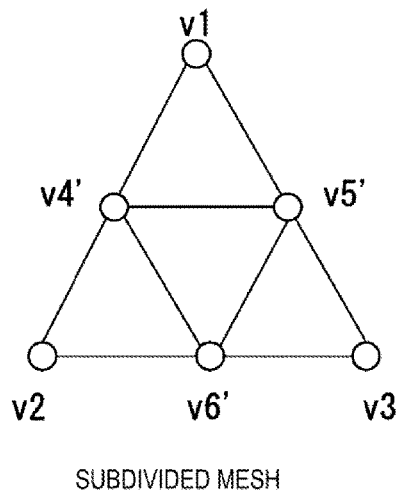

Similarly to the mesh subdivision unit 3071, the mesh subdivision unit 1152 subdivides the base mesh to generate a subdivided mesh (FIG. 14C).

$$v4'=(v1+v2)/2$$

$$v5'=(v1+v3)/2$$

$$v6'=(v2+v3)/2$$

Figure 14D:
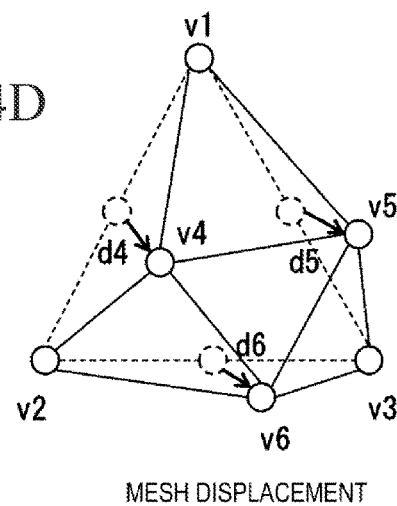

The mesh displacement derivation unit 1153 derives the displacements d4, d5, and d6 of the vertices v4, v5, and v6 for the vertices v4', v5', and v6' as the mesh displacements, based on the mesh and the subdivided mesh, and outputs the mesh displacements (FIG. 14D).

$$d4=v4-v4'$$

$$d5=v5-v5'$$

$$d6=v6-v6$$

Coding of Base Mesh

Figure 11:
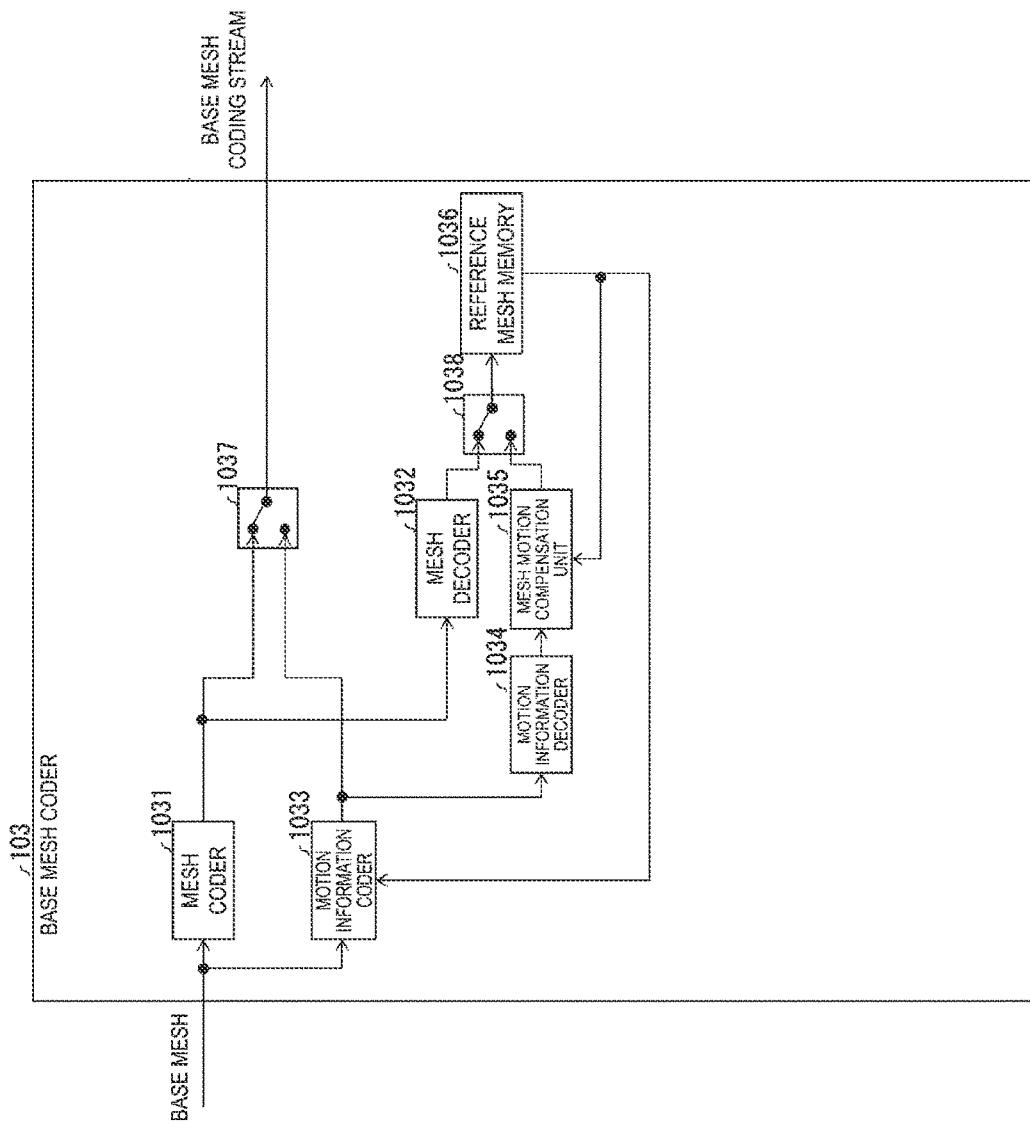
FIG. 11 is a functional block diagram illustrating a configuration of a base mesh coder 103.

FIG. 11 is a functional block diagram illustrating a configuration of the base mesh coder 103. The base mesh coder 103 includes a mesh coder 1031, a mesh decoder 1032, a motion information coder 1033, a motion information decoder 1034, a mesh motion compensation unit 1035, a reference mesh memory 1036, a switch 1037, and a switch 1038. The base mesh coder 103 may include a base mesh quantization unit (not illustrated) after input of the base mesh. In a case that the base mesh is coded (intra-coded) without reference to another base mesh (for example, a base mesh that has already been coded), the switch 1037 and the switch 1038 are connected to a side on which motion compensation is not performed. Otherwise, in other words, in a case that the base mesh is coded (inter-coded) with reference to another base mesh, the switch 1037 and the switch 1038 are connected to a side on which motion compensation is performed.

The mesh coder 1031 has a base mesh intra-coding function, and intra-codes the base mesh and outputs a base mesh coding stream. As a coding scheme, Draco or the like is used.

The mesh decoder 1032 is similar to the mesh decoder 3031, and thus description thereof will be omitted.

The motion information coder 1033 has a base mesh inter-coding function, and inter-codes the base mesh and outputs a base mesh coding stream. As a coding scheme, entropy coding such as arithmetic coding is used.

The motion information decoder 1034 is similar to the motion information decoder 3032, and thus description thereof will be omitted.

The mesh motion compensation unit 1035 is similar to the mesh motion compensation unit 3033, and thus description thereof will be omitted.

The reference mesh memory 1036 is similar to the reference mesh memory 3034, and thus description thereof will be omitted.

Coding of Mesh Displacement

Figure 12:
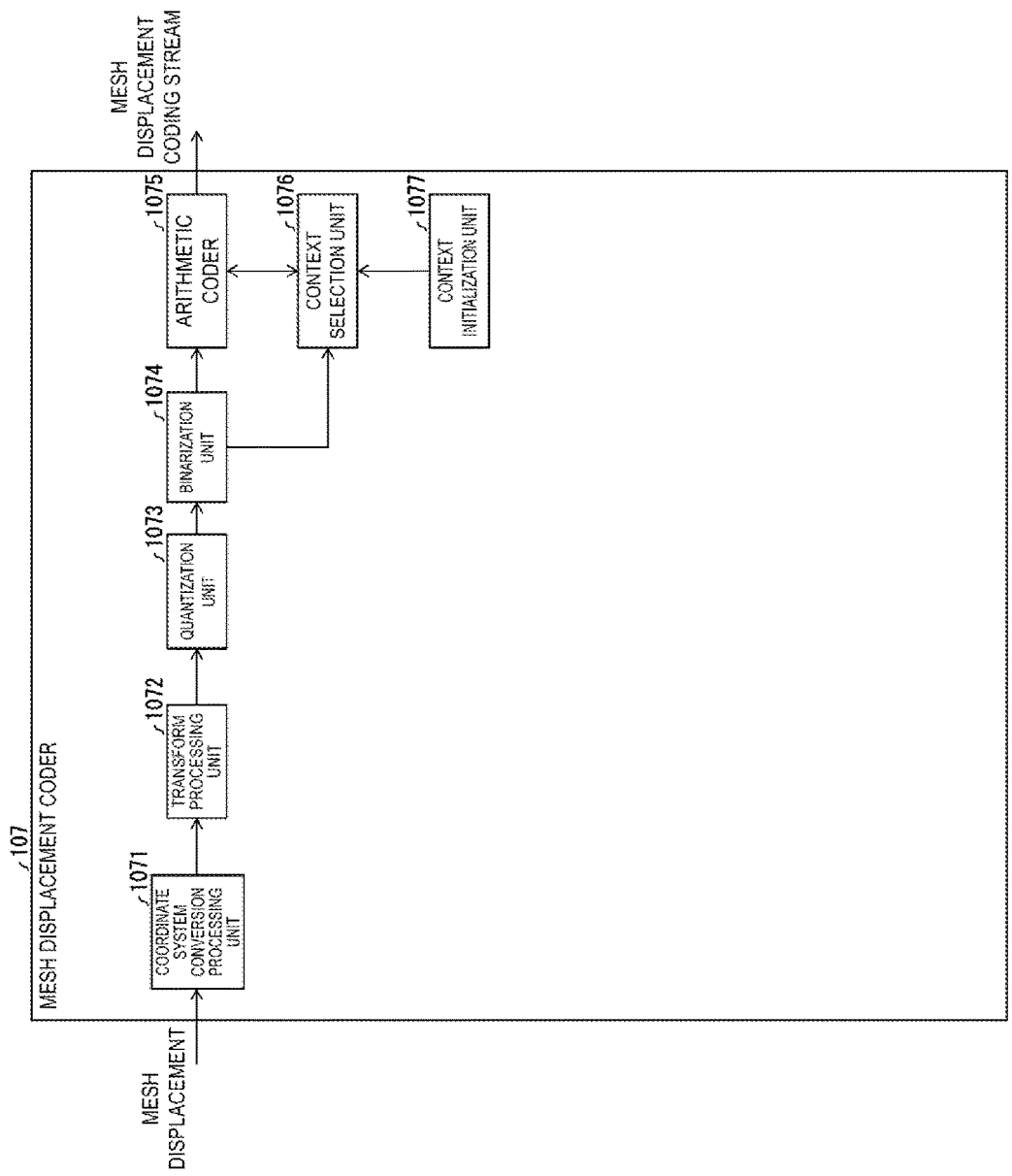
FIG. 12 is a functional block diagram illustrating a configuration of a mesh displacement coder 107.

FIG. 12 is a functional block diagram illustrating a configuration of the mesh displacement coder 107. The mesh displacement coder 107 includes a coordinate system conversion processing unit 1071, a conversion processing unit 1072, a quantization unit 1073, a binarization unit 1074, an arithmetic coder 1075, a context selection unit 1076, and a context initialization unit 1077.

The coordinate system conversion processing unit 1071 converts the coordinate system of the mesh displacement from the Cartesian coordinate system to a coordinate system (for example, the local coordinate system) for coding the displacement, based on the value of the coordinate system conversion parameter displacementCoordinateSystem. Here, disp is a three-dimensional vector indicating the mesh displacement before coordinate system conversion, d is a three-dimensional vector indicating the mesh displacement after coordinate system conversion, and n_vec, t_vec, and b_vec are three-dimensional vectors (of the Cartesian coordinate system) indicating respective axes of the local coordinate system.

if (displacementCoordinateSystem==0) {
  d=disp
} else if (displacementCoordinateSystem==1){
  d=(disp*n_vec, disp*t_vec, disp*b_vec)
}

The mesh displacement coder 107 may update the value of displacementCoordinateSystem at a sequence level. Alternatively, the mesh displacement coder 107 may update the value at a picture/frame level. The initial value is 0, which indicates the Cartesian coordinate system.

In a case that displacementCoordinateSystem is updated at a sequence level, the syntax of the configuration of FIG. 7 is used. asps_vdmc_ext_displacement_coordinate_system is set equal to 0 in a case of the Cartesian coordinate system, and is set equal to 1 in a case of the local coordinate system.

In a case that displacementCoordinateSystem is changed at a picture/frame level, the syntax of the configuration of FIG. 8 is used. afps_vdmc_ext_displacement_coordinate_system_enable_flag is set equal to 1 in a case that the coordinate system is to be updated, and is set equal to 0 in a case that the coordinate system is not to be updated. afps_vdmc_ext_displacement_coordinate_system is set equal to 0 in a case of the Cartesian coordinate system, and is set equal to 1 in a case of the local coordinate system.

The transform processing unit 1072 performs transform f (for example, wavelet transform) to derive the mesh displacement Tdisp after transform.

$$T\text{disp}[0][\ ]=f(d[0][\ ])$$

$$T\text{disp}[1][\ ]=f(d[1][\ ])$$

$$T\text{disp}[2][\ ]=f(d[2][\ ])$$

The quantization unit 1073 performs quantization, based on a quantization scale value scale derived from a quantization parameter of each component of the mesh displacement, and derives the mesh displacement Qdisp after quantization.

```
Qdisp[0][ ] = Tdisp[0][ ] / scale[0]
Qdisp[1][ ] = Tdisp[1][ ] / scale[1]
Qdisp[2][ ] = Tdisp[2][ ] / scale[2]
```

Alternatively, the scale value may be approximated with the exponent of 2, and Qdisp may be derived according to the following equations.

```
scale[i] = 1 << scale2[i]
Qdisp[0][ ] = Tdisp[0][ ] >> scale2[0]
Qdisp[1][ ] = Tdisp[1][ ] >> scale2[1]
Qdisp[2][ ] = Tdisp[2][ ] >> scale2[2]
```

The binarization unit 1074 codes the quantized mesh displacement Qdisp being a multivalue signal into a binary signal. The binary signal may be a k-th order exponential Golomb code.

The arithmetic coder 1075 arithmetically codes the binary signal and outputs a mesh displacement coding stream.

The context selection unit 1076 is similar to the context selection unit 3056, and thus description thereof will be omitted.

The context initialization unit 1077 is similar to the context initialization unit 3057, and thus description thereof will be omitted.

The mesh displacement coder 107 may update the value of displacementContextInitType at a sequence level. Alternatively, the mesh displacement coder 107 may update the value at a picture/frame level.

In a case that context initialization parameters are updated at a sequence level, the syntax of the configuration of FIG. 7 is used. asps_vdmc_ext_displacement_context_init_type is set equal to the value of displacementContextInitType (0 in a case of initialization for each GoF, and 1 in a case of initialization for each segment). asps_vdmc_ext_displacement_context_init_index is set equal to the value of displacementContextInitIndex (the index of the context initialization table).

In a case that the context initialization parameters are changed at a picture/frame level, the syntax of the configuration of FIG. 8 is used. afps_vdmc_ext_displacement_context_init_enable_flag is set equal to 1 in a case that the context initialization parameters are to be updated, and is set equal to 0 in a case that the context initialization parameters are not to be updated. afps_vdmc_ext_displacement_context_init_type is set equal to the value of displacementContextInitType (0 in a case of initialization for each GoF, and 1 in a case of initialization for each segment). afps_vdmc_ext_displacement_context_init_index is set equal to the value of displacementContextInitIndex (the index of the context initialization table).

As described above, the initialization timing and the initial value of the context can be set depending on the context initialization parameters. In a case that the context is initialized for each frame, there is no dependency on the context between frames, and therefore random access to any frame can be easily performed, and coding efficiency can be enhanced. In a case that the context is initialized for each GoF, coding efficiency can be further enhanced in comparison to a case that the context is initialized for each frame. The initial value of the context is switched depending on the features of the mesh displacement, and therefore coding efficiency can be enhanced.

The embodiment of the present disclosure has been described in detail above referring to the drawings, but the specific configuration is not limited to the above embodiment and various amendments can be made to a design that fall within the scope that does not depart from the gist of the present disclosure.

Application Examples

The above-mentioned 3D data coding apparatus 11 and 3D data decoding apparatus 31 can be utilized being installed to various apparatuses performing transmission, reception, recording, and regeneration of 3D data. Note that, the 3D data may be natural 3D data imaged by a camera or the like, or may be artificial 3D data (including CG and GUI) generated by a computer or the like.

The embodiment of the present disclosure is not limited to the above-described embodiment, and various modifications are possible within the scope of the claims. That is, an embodiment obtained by combining technical means modified appropriately within the scope of the claims is also included in the technical scope of the present disclosure.

INDUSTRIAL APPLICABILITY

The embodiments of the present disclosure can be preferably applied to the 3D data decoding apparatus that decodes coded data in which 3D data is coded, and the 3D data coding apparatus that generates coded data in which 3D data is coded. The embodiments of the present disclosure can be preferably applied to a data structure of coded data generated by the 3D data coding apparatus and referred to by the 3D data decoding apparatus.

REFERENCE SIGNS LIST 11 3D data coding apparatus
101 Atlas information coder
103 Base mesh coder
1031 Mesh coder
1032 Mesh decoder
1033 Motion information coder
1034 Motion information decoder
1035 Mesh motion compensation unit
1036 Reference mesh memory
1037 Switch
1038 Switch
104 Base mesh decoder
106 Mesh displacement update unit
107 Mesh displacement coder
1071 Coordinate system conversion processing unit
1072 Transform processing unit
1073 Quantization unit
1074 Binarization unit
1075 Arithmetic coder
1076 Context selection unit
1077 Context initialization unit
108 Mesh displacement decoder
109 Mesh reconstruction unit
110 Attribute transfer unit
111 Padding unit
112 Color space conversion processing unit
113 Attribute coder
114 Multiplexing unit
115 Mesh separation unit
1151 Mesh decimation unit
1152 Mesh subdivision unit
1153 Mesh displacement derivation unit
21 Network
31 3D data decoding apparatus
301 De-multiplexing unit
302 Atlas information decoder
303 Base mesh decoder
3031 Mesh decoder
3032 Motion information decoder
3033 Mesh motion compensation unit
3034 Reference mesh memory
3035 Switch
3036 Switch
305 Mesh displacement decoder
3051 Arithmetic decoder
3052 De-binarization unit
3053 Inverse quantization unit
3054 Inverse transform processing unit
3055 Coordinate system conversion processing unit
3056 Context selection unit
3057 Context initialization unit
307 Mesh reconstruction unit
306 Attribute decoder
3071 Mesh subdivision unit
3072 Mesh deformation unit
308 Color space conversion processing unit
41 3D data display apparatus

The invention claimed is:

1. A three-dimensional (3D) data decoding apparatus for decoding coded data, the 3D data decoding apparatus comprising:
an arithmetic decoder configured to arithmetically decode mesh displacement from the coded data;
a context selection unit configured to select a context in the arithmetic decoding; and
a context initialization unit configured to set an initial value of the context, wherein
in the context initialization unit, a context initialization parameter for initializing the context is decoded from the coded data,
the context initialization parameter includes initialization timing information indicating initialization timing of the context, and
in a case that the initialization timing information includes a first value, the context initialization unit initializes the context only in a case of a start of a segment and a random access point, and in a case that the initialization timing information includes a second value, the context initialization unit invariably initializes the context at the start of the segment.

2. The 3D data decoding apparatus according to claim 1, wherein
the context initialization parameter further includes context initial value selection information indicating a method for setting the initial value of the context.

3. A three-dimensional (3D) data coding apparatus for coding 3D data, the 3D data coding apparatus comprising:
an arithmetic coder configured to arithmetically code mesh displacement;
a context selection unit configured to select a context in the arithmetic coding; and
a context initialization unit configured to set an initial value of the context, wherein
in the context initialization unit, a context initialization parameter for initializing the context is coded into coded data,
the context initialization parameter includes initialization timing information indicating initialization timing of the context, and
in a case that the initialization timing information includes a first value, the context initialization unit initializes the context only in a case of a start of a segment and a random access point, and in a case that the initialization timing information includes a second value, the context initialization unit invariably initializes the context at the start of the segment.

4. The 3D data coding apparatus according to claim 3, wherein
the context initialization parameter further includes context initial value selection information indicating a method for setting the initial value of the context.

* * * * *